US011681901B2

(12) United States Patent
Qiu et al.

(10) Patent No.: US 11,681,901 B2
(45) Date of Patent: Jun. 20, 2023

(54) QUANTIFYING THE PREDICTIVE UNCERTAINTY OF NEURAL NETWORKS VIA RESIDUAL ESTIMATION WITH I/O KERNEL

(71) Applicant: Cognizant Technology Solutions U.S. Corporation, College Station, TX (US)

(72) Inventors: Xin Qiu, San Francisco, CA (US); Risto Miikkulainen, Stanford, CA (US); Elliot Meyerson, San Francisco, CA (US)

(73) Assignee: Cognizant Technology Solutions U.S. Corporation, College Station, TX (US)

( * ) Notice: Subject to any disclaimer, the term of this patent is extended or adjusted under 35 U.S.C. 154(b) by 395 days.

(21) Appl. No.: 16/879,934

(22) Filed: May 21, 2020

(65) Prior Publication Data

US 2020/0372327 A1 Nov. 26, 2020

Related U.S. Application Data

(60) Provisional application No. 62/851,782, filed on May 23, 2019.

(51) Int. Cl.
*G06N 3/047* (2023.01)
*G06F 17/16* (2006.01)
*G06N 3/08* (2023.01)

(52) U.S. Cl.
CPC ............. *G06N 3/047* (2023.01); *G06F 17/16* (2013.01); *G06N 3/08* (2013.01)

(58) Field of Classification Search
CPC ........ G06N 3/0472; G06N 3/08; G06N 3/006; G06N 3/0454; G06N 3/0481; G06N 5/003; G06N 20/20; G06N 7/005; G06N 20/10; G06F 17/16
See application file for complete search history.

(56) References Cited

U.S. PATENT DOCUMENTS

| | | | |
|---|---|---|---|
| 5,111,531 A | 5/1992 | Grayson et al. | |
| 6,169,980 B1 | 1/2001 | Keller et al. | |
| 6,282,529 B1 | 8/2001 | Neuneier et al. | |
| 2006/0010089 A1 | 1/2006 | Goodnight et al. | |
| 2008/0301075 A1 | 12/2008 | Bolt et al. | |
| 2012/0323495 A1* | 12/2012 | Zhou | E21C 39/00 702/9 |
| 2021/0084301 A1* | 3/2021 | Siekmann | H04N 19/159 |

OTHER PUBLICATIONS

Mackay, "A practical Bayesian framework for backpropagation networks," Neural Comput., 4(3): 448-472, May 1992.

(Continued)

*Primary Examiner* — Mohammad K Islam
(74) *Attorney, Agent, or Firm* — Dawn-Marie Bey; Bey & Cotropia PLLC

(57) ABSTRACT

A residual estimation with an I/O kernel ("RIO") framework provides estimates of predictive uncertainty of neural networks, and reduces their point-prediction errors. The process captures neural network ("NN") behavior by estimating their residuals with an I/O kernel using a modified Gaussian process ("GP"). RIO is applicable to real-world problems, and, by using a sparse GP approximation, scales well to large datasets. RIO can be applied directly to any pretrained NNs without modifications to model architecture or training pipeline.

5 Claims, 11 Drawing Sheets

(56) References Cited

OTHER PUBLICATIONS

Hinton, et al., "Keeping neural networks simple by minimizing the description length of the weights," In Proceedings of the Sixth Annual Conference on Computational Learning Theory, COLT '93, pp. 5-13, New York, NY, USA, 1993.
Graves, "Practical variational inference for neural networks," In Proceedings of the 24th International Conference on Neural Information Processing Systems, NIPS '11, pp. 2348-2356, USA, 2011.
Blundell, et al., "Weight uncertainty in neural networks," In Proceedings of the 32nd International Conference on Machine Learning, vol. 37, ICML '15, pp. 1613-1622, JMLR.org, 2015 (arXiv: 1505.05424v2).
Lakshminarayanan, et al., "Simple and scalable predictive uncertainty estimation using deep ensembles," 31st Conference on Neural Information Processing Systems (NIPS 2017), Long Beach, CA, USA (arXiv: 1612.01474v3).
Lee, et al., "Deep neural networks as Gaussian processes," International Conference on Learning Representations, 2018 (arXiv 1711.00165v3).
Wilson, et al., "Deep kernel learning," Proceedings of the 19th International Conference on Artificial Intelligence and Statistics, vol. 51 of Proceedings of Machine Learning Research, pp. 370-378, Cadiz, Spain, May 9-11, 2016 (arXiv: 1511.02222v1).
Iwata, et al., "Improving Output Uncertainty Estimation and Generalization in Deep Learning via Neural Network Gauusian Processes," arXiv e-prints, art, arXiv: 1707.05922, Jul. 2017.
Garnelo, et al., "Conditional neural processes," Proceedings of the 35th International Conference on Machine Learning, vol. 80 of Proceedings of Machine Learning Research, pp. 1704-1713, PMLR, Jul. 10-15, 2018 (arXiv: 1807.01613v1).
Garnelo, et al., "Neural processes," CoRR, arXiv: 1807.01622v1, Jul. 4, 2018, 11 pp.
Kim, et al., "Attentive neural processes," CoRR, arXiv: 1901.05761v, Jul. 9, 2019, 18 pp.
Gal, et al., "Dropout as a Bayesian approximation: Representing model uncertainty in deep learning," In Proceedings of the 33rd International Conference on Machine Learning, vol. 48, ICML '16, pp. 1050-1059, JMLR.org, 2016 (arXiv: 1506.02142v6).
Hensman, et al., "Gaussian processes for big data," In Proceedings of the Twenty-Ninth Conference on Uncertainty in Artificial Intelligence, UAI '13, pp. 282-290, 2013.
R. H. Byrd, et al., "A Limited Memory Algorithm for Bound-Constrained Optimization," SIAM Journal on Scientific and Statistical Computing, 16, 5, pp. 1190-1208, 1995.
Tsun-Yi Yang, et al., "Ssr-net: A compact soft stagewise regression network for age estimation," In Proc. of the Twenty-Seventh International Joint Conference on Artificial Intelligence, (IJCAI-18), pp. 1078-1084, 2018.
Gao Huang, et al., "Densely connected convolutional networks," In Proc. of CVPR, pp. 4700-4708, 2017 (arXiv: 1608.06993v5).
Xin Qiu, et al., "Quantifying Point-Prediction Uncertainty in Neural Networks Via Residual Estimation With an I/O Kernel," published as a conference paper at ICLR 2020 and available in version 1 (published arXiv: 1906.00588v1), Jun. 3, 2019.
Xin Qiu, et al., "Quantifying Point-Prediction Uncertainty in Neural Networks Via Residual Estimation With an I/O Kernel," published as a conference paper at ICLR 2020 and available in version 2 (published arXiv: 1906.00588v2), Sep. 25, 2019.
Xin Qiu, et al., "Quantifying Point-Prediction Uncertainty in Neural Networks Via Residual Estimation With an I/O Kernel," published as a conference paper at ICLR 2020 and available in version 3 (published arXiv: 1906.00588v3), Feb. 17, 2020.
Gadaleta, "Know what you predict: estimating uncertainty with neural networks" [online], Jan. 21, 2019 [retrieved on Sep. 1, 2020], In amethix.com/, Retrieved from the Internet: https://amethix.com/know-what-you-predict-estimating-uncertainty-with-neural-networks/.
Rudner, et al., "On the Connection between Neural Processes and Gaussian Processes with Deep Kernels" [online], [retrieved on Sep. 1, 2020], In: Third workshop on Bayesian Deep Learning (NeurIPS 2018), Montreal, Canada, Retrieved from the Internet: https://www.bibsonomy.org/bibtex/641fa5ba9399e5cdeb99157a95c90d4/.
International Search Report and Written Opinion for PCT App. No. PCT/US20/33932, dated Oct. 20, 2020, 10 pp.
Hu, Zhiting, et al., "24: Gaussian Process and Deep Kernel Learning," 10-708: Probabilistic Graphical Models 10-708, Spring 2017, 9 pp.

* cited by examiner

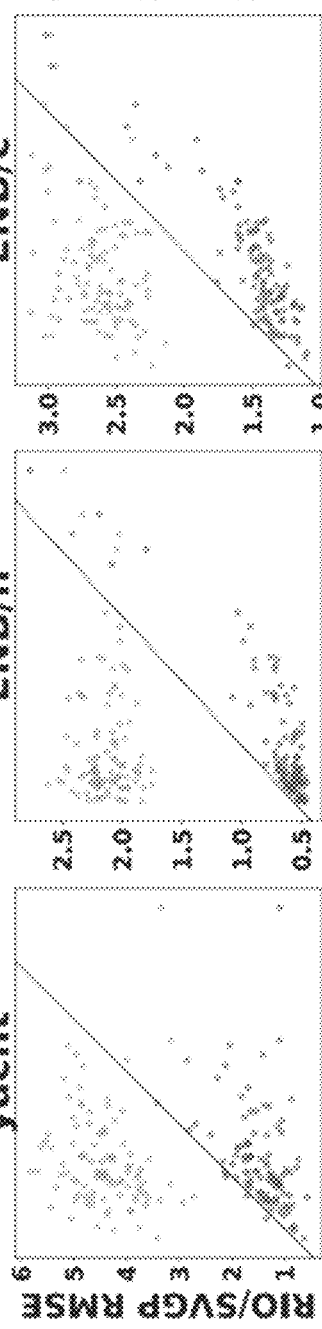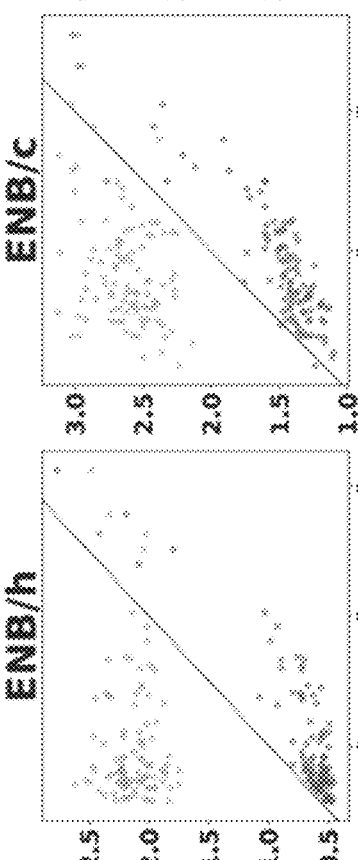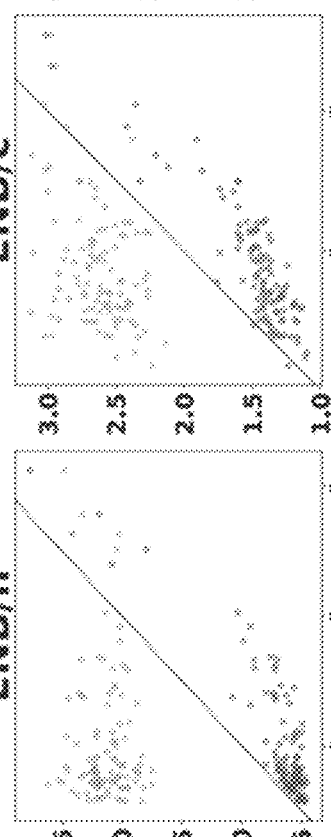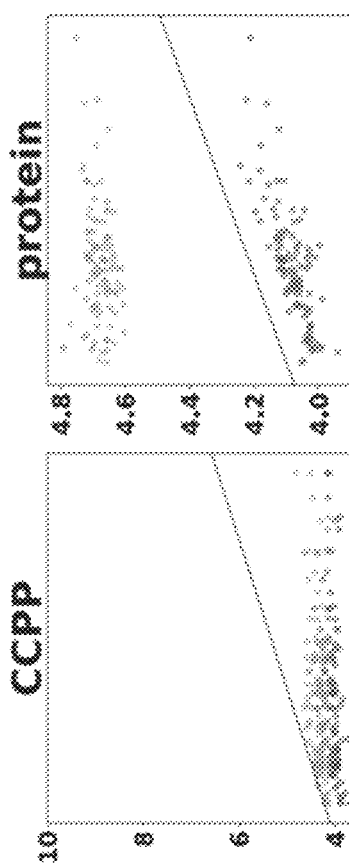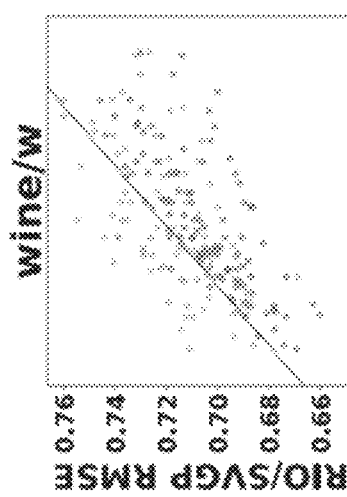

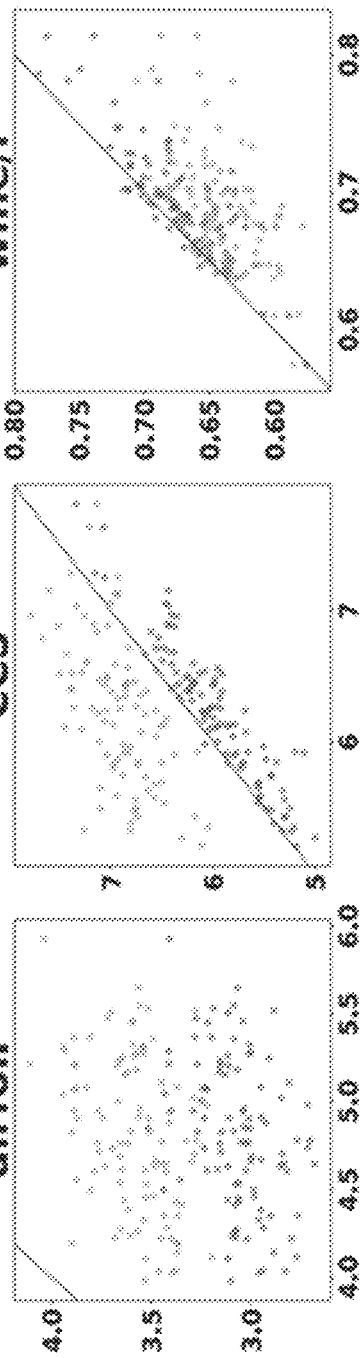
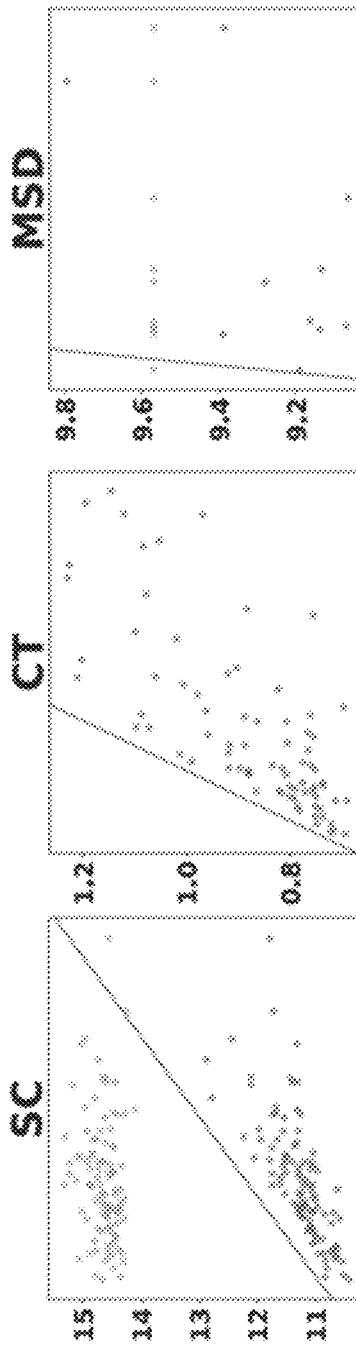

QUANTIFYING THE PREDICTIVE UNCERTAINTY OF NEURAL NETWORKS VIA RESIDUAL ESTIMATION WITH I/O KERNEL

CROSS REFERENCE TO RELATED APPLICATIONS

This application claims benefit of priority to U.S. Provisional Application No. 62/851,782 entitled "QUANTIFYING THE PREDICTIVE UNCERTAINTY OF NEURAL NETWORKS VIA RESIDUAL ESTIMATION WITH I/O KERNEL" filed May 23, 2019 which is incorporated herein by reference in its entirety.

Additionally, the article by Xin Qui et al., entitled QUANTIFYING POINT-PREDICTION UNCERTAINTY IN NEURAL NETWORKS VIA RESIDUAL ESTIMATION WITH AN I/O KERNEL published as a conference paper at ICLR 2020 and available in version 1 (published arXiv: 1906.00588v1; Jun. 3, 2019), version 2 (published arXiv: 1906.00588v2; Sep. 29, 2019) and version 3 (published arXiv:1906.00588v3; Feb. 17, 2020) is incorporated herein by reference in its entirety. The article lists overlapping authors with the inventors and provides additional description and support for the embodiment set forth herein.

FIELD OF THE TECHNOLOGY

The field of the technology is neural networks, specifically, processes for estimating uncertainty in a pretrained standard neural network.

BACKGROUND

Neural Networks (NNs) have been extensively used for a wide spectrum of real-world regression tasks, where the goal is to predict a numerical outcome such as revenue, effectiveness, or a quantitative result. Researchers and practitioners have applied NNs to a wide variety of fields, including manufacturing, bioinformatics, physics, finance, chemistry, healthcare, etc. The potential applicability of NNs is virtually limitless. In many such tasks, the single point prediction is not enough: the uncertainty (i.e. risk or confidence) of that prediction must also be estimated. By way of example, using a NN to predict a medical treatment outcome without any check on accuracy of the predicted outcome, is not ideal. Whereas, in the case of regression, providing a 95% confidence interval around the prediction allows the decision maker to anticipate the possible outcomes with explicit probability.

Standard NNs, which are most often used in such tasks, do not provide uncertainty information. Existing approaches attempt to address this issue by combining Bayesian models with NNs, but these models are hard to implement, more expensive to train, and usually do not predict as accurately as standard NNs. From the classical Bayesian Neural Network in which a distribution of weights is learned, to the recent neural processes, in which a distribution over functions is defined, all such methods require significant modifications to the model infrastructure and training pipeline. Compared to standard (non-Bayesian) NNs, these new models are often computationally slower to train and harder to, creating tremendous difficulty for practical uses. The following references provide exemplary descriptions of various existing approaches: MacKay, A practical bayesian framework for backpropagation networks. Neural Comput., 4(3): 448-472, May 1992; Hinton et al., Keeping the neural networks simple by minimizing the description length of the weights, In Proceedings of the Sixth Annual Conference on Computational Learning Theory, COLT '93, pp. 5-13, New York, N.Y., USA, 1993; Graves, Practical variational inference for neural networks, In Proceedings of the $24^{th}$ International Conference on Neural Information Processing Systems, NIPS'11, pp. 2348-2356, USA, 2011; Blundell, et al., Weight uncertainty in neural networks, In Proceedings of the 32Nd International Conference on International Conference on Machine Learning—Volume 37, ICML'15, pp. 1613-1622, JMLR.org., 2015; Lakshminarayanan, et al., Simple and scalable predictive uncertainty estimation using deep ensembles, 31st Conference on Neural Information Processing Systems (NIPS 2017), Long Beach, Calif., USA; Lee, et al., Deep neural networks as gaussian processes. International Conference on Learning Representations, 2018; Wilson, et al., Deep kernel learning, Proceedings of the 19th International Conference on Artificial Intelligence and Statistics, volume 51 of Proceedings of Machine Learning Research, pp. 370-378, Cadiz, Spain, 9-11 May 2016; Iwata, et al., Improving Output Uncertainty Estimation and Generalization in Deep Learning via Neural Network Gaussian Processes, arXiv e-prints, art. arXiv:1707.05922, July 2017; Garnelo, et al., Conditional neural processes, Proceedings of the 35th International Conference on Machine Learning, volume 80 of Proceedings of Machine Learning Research, pp. 1704-1713, PMLR, 10-15 July 2018a; Garnelo, et al., Neural processes, CoRR, abs/1807.01622, 2018b; Kim, et al., Attentive neural processes, CoRR, abs/1901.05761, 2019; and Gal et al., Dropout as a bayesian approximation: Representing model uncertainty in deep learning, In Proceedings of the 33rd International Conference on International Conference on Machine Learning—Volume 48, ICML'16, pp. 1050-1059, JMLR.org, 2016 (hereafter "Gal").

The exemplary models described in the listed references all require significant modifications to the original NN model and training pipeline. Compared to standard NNs, they are also less computationally efficient and more difficult for practitioners to implement. In the approach described in the Gal reference, Monte Carlo dropout was used to estimate the predictive uncertainty of dropout. However, this method is restricted to dropout NNs, and also requires modifications to the NN inference process.

Accordingly, quantifying point-prediction uncertainty in standard NNs and other prediction models, which are overwhelmingly popular in practical applications, still remains a challenging problem with significant potential impact.

SUMMARY OF CERTAIN EMBODIMENTS

In a first exemplary embodiments, a process for training a Gaussian process (GP) to estimate residuals of a neural network (NN) model includes: training a NN model to make one or more predictions using a training data ($\mathcal{X}$, y) input set, wherein the training data input set includes $(x_i, y_i)_{i=1}^n$ wherein $y_i$ are the expected outcomes by the NN model given input $x_i$; storing an output data set from the NN model, including the one or more predictions resulting from operation on the training data input set, wherein the output data set includes $(x_i, \hat{y}_i)_{i=1}^n$, wherein $\hat{y}_i$ are the predicted outcomes by the NN model given input $x_i$; and training a Gaussian process (GP) to estimate residuals of the NN model when applied to raw input data $x_*$ using the training data input set $(x_i, y_i)_{i=1}^n$ and the output data set $(x_i, \hat{y}_i)_{i=1}^n$.

In a second exemplary embodiment, a process for correcting one or more predictions of a neural network (NN)

model includes: applying a modified Gaussian process (GP) to predictions $\hat{y}_*$ of a neural network (NN) model applied to raw input data $x_*$, wherein the modified (GP) is trained using both input and output data sets from training of the NN model, the applying including: (i) calculating residual mean; (ii) calculating residual variance; and (iii) returning distribution of calibrated prediction $\hat{y}'_*$.

In a third exemplary embodiment, a process for correcting one or more predictions of a regression model includes: training a regression model to make one or more predictions using an input training dataset $(x_i, y_i)$; storing output dataset $(x_i, \hat{y}_i)$ of the trained regression model; training a Gaussian process using $(x_i, y_i)$ and $(x_i, \hat{y}_i)$ to estimate residuals of the trained regression model when applied to real-world input data $x_{RW}$ to make one or more predictions $y_{RW}$.

In a fourth exemplary embodiment, a computer-readable medium storing instructions that, when executed by a computer, perform a process for correcting one or more predictions of a regression model includes: training a regression model to make one or more predictions using a input training dataset $(x_i, y_i)$; storing output dataset $(x_i, \hat{y}_i)$ of the trained regression model; training a Gaussian process using $(x_i, y_i)$ and $(x_i, \hat{y}_i)$ to estimate residuals of the trained regression model when applied to real-world input data $x_{RW}$ to make one or more predictions $y_{RW}$.

BRIEF SUMMARY OF FIGURES

The patent or application file contains at least one drawing executed in color. Copies of this patent or patent application publication with color drawing(s) will be provided by the Office upon request and payment of the necessary fee.

FIGS. 2a and 2b show example behavior of RIO capturing uncertainty of more and less accurate NNs in accordance with one or more embodiments herein;

FIGS. 3(a)-3(l) illustrate comparisons between NN, RIO and SVGP in terms of prediction RMSE for different datasets in accordance with one or more embodiments herein;

FIGS. 4a -4l plot the distributions of ground truth labels (outcomes), original NN predictions and predictions corrected after RIO for a randomly picked run for each different dataset in accordance with one or more embodiments herein;

DETAILED DESCRIPTION

Figure 1A:
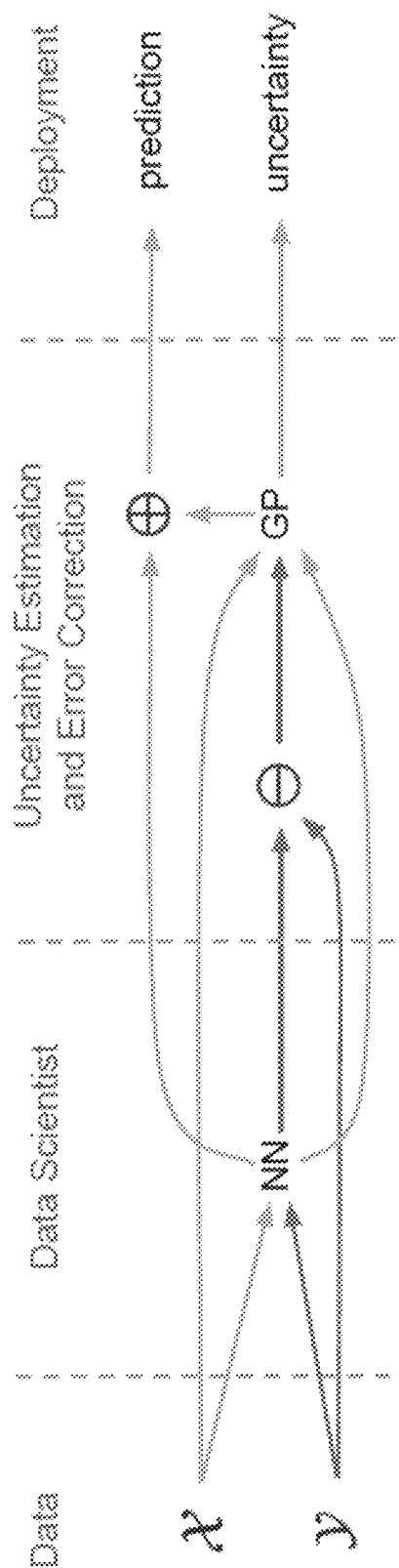
FIGS. 1a and 2b are directed to schematic process flows illustrating the RIO process in accordance with one or more embodiments herein.

The embodiments described herein detail a process that is able to estimate the predictive uncertainty of standard NNs, and also corrects the predictions of standard neural networks. The process is able to quantitatively estimate the predictive uncertainty of standard neural networks without any modifications to the model structure or training pipeline. The process can be directly applied to any pretrained neural networks without retraining them. The general approach is to estimate the prediction residuals of neural networks using a modified Gaussian process (hereafter "GP"), which introduces a new composite kernel that makes use of both inputs and outputs of the neural networks. The process is referred to herein as RIO (for Residual estimation with an I/O kernel).

By way of background and as will be recognized by those skilled in the art, notation for NN, GP and the approximation for GP, SVGP (referenced herein below) are provided herein.

Neural Networks (NNs) learn a nonlinear transformation from input to output space based on a number of training examples. Let $\mathcal{D} \subseteq \mathbb{R}^{d_{in}} \times \mathbb{R}^{d_{out}}$ denote the training dataset with size n, and $\mathcal{X}=\{x_i:(x_i, y_i)\in\mathcal{D}, x_i=[x_i^1,x_i^2, \ldots, x_i^{d_{in}}]|i=1,2, \ldots ,n\}$ and $\mathcal{Y}=\{y_i: (x_i,y_i) \in\mathcal{D}, y_i=[y_i^1, y_i^2, \ldots ,y_i^{d_{out}}]|i=1,2, \ldots, n\}$ denote the inputs and outputs (i.e., targets). A fully-connected feed-forward neural network with L hidden layers of width $N_l$ (for layer l= 1,2, . . . , L) performs the following computations: Let $z_l^j$ denote the output value of jth node in lth hidden layer given input $x_i$, then $z_1^j=\phi(\Sigma_{k=1}^{d_{in}} w_1^{j,k} x_i^k + b_1^j)$, for l=1 and $z_l^j=\phi(\Sigma_{k=1}^{N_{l-1}} w_l^{j,k} z_{l-1}^k + b_l^j)$, for l=2, . . . ,L, where $w_l^{j,k}$ denotes the weight on the connection from kth node in previous layer to jth node in lth hidden layer, $b_l^j$ denotes the bias of jth node in lth hidden layer, and $\phi$ is a nonlinear activation function. The output value of jth node in output layer is then given by $\hat{y}_i^j=\Sigma_{k=1}^{N_L} w_{out}^{j,k} z_L^k + b_{out}^j$, where $w_{out}^{j,k}$ denotes the weight on the connection from kth node in last hidden layer to jth node in output layer, and $b_{out}^j$ denotes the bias of jth node in output layer.

A gradient-based optimizer is usually used to learn the weights and bias given a predefined loss function, e.g., a squared loss function $$\mathcal{L} = \frac{1}{n}\sum_{i=1}^{n}(y_i - \hat{y}_i)^2.$$

For a standard NN, the learned parameters are fixed, so the NN output $\hat{y}_i$ is also a fixed point. For a Bayesian NN, a distribution of the parameters is learned, so the NN output is a distribution of $\hat{y}_i$. However, a pretrained standard NN needs to be augmented, e.g., with a Gaussian Process, to achieve the same result.

A GP is a collection of random variables, such that any finite collection of these variables follows a joint multivariate Gaussian distribution. Given a training dataset $\mathcal{X}=\{x_i|i=1,2, \ldots ,n\}$ and $y=\{y_i=f(x_i)+\epsilon|i=1,2, \ldots ,n\}$, where $\epsilon$ denotes additive independent identically distributed Gaussian noise, the first step for GP is to fit itself to these training data assuming $y \sim \mathcal{N}(0, K(\mathcal{X}, \mathcal{X})+\sigma_n^2 I)$, where $\mathcal{N}$ denotes a multivariate Gaussian distribution with mean 0 and covariance matrix $K(\mathcal{X}, \mathcal{X})+\sigma_n^2 I$. $K(\mathcal{X}, \mathcal{X})$ denotes the kernel-based covariance matrix at all pairs of training points with each entry $k_{i,j}=k(x_i,x_j)$, and $\sigma_n^2$ denotes the noise variance of observations. One commonly used kernel is the radial basis function (RBF) kernel, which is defined as $$k(x_i, x_j) = \sigma_f^2 \exp\left(-\frac{1}{2l_f^2}\|x_i - x_j\|^2\right).$$

The signal variance $\sigma_f^2$, length scale $l_f$ and noise variance $\sigma_n^2$ are trainable hyperparameters. The hyperparameters of the covariance function are optimized during the learning process to maximize the log marginal likelihood log $p(y|\mathcal{X})$.

After fitting phase, the GP is utilized to predict the distribution of label $y_*$ given a test point $x_*$. This prediction is given by $y_* | \mathcal{X}, y, x_* \sim \mathcal{N}(\bar{y}_*, \text{var}(y_*))$ with $\bar{y}_* = k_*^T (K(\mathcal{X}, \mathcal{X}) + \sigma_n^2 I)^{-1} y$ and $\text{var}(y_*) = k(x_*, x_*) - k_*^T (K(\mathcal{X}, \mathcal{X}) + \sigma_n^2 I)^{-1} k_*$, where $k_*$ denotes the vector of kernel-based covariances (i.e., $k(x_*, x_i)$) between $x_*$ and all the training points, and $y$ denotes the vector of all training labels. Unlike with NN, the uncertainty of the prediction of a GP is therefore explicitly quantified.

The main limitation of the standard GP, as defined above, is that it is excessively expensive in both computational and storage cost. For a dataset with n data points, the inference of standard GP has time complexity $\mathcal{O}(n^3)$ and space complexity $\mathcal{O}(n^2)$. To circumvent this issue, sparse GP methods were developed to approximate the original GP by introducing inducing variables. These approximation approaches lead to a computational complexity of $\mathcal{O}(nm^2)$ and space complexity of $\mathcal{O}(nm)$, where m is the number of inducing variables. Following this line of work, SVGP further improves the scalability of the approach by applying Stochastic Variational Inference (SVI) technique, as follows.

Consider the same training dataset and GP as above, and assume a set of inducing variables as $\mathcal{Z} = \{z_i | i=1,2,\ldots,m\}$ and $\mathcal{U} = \{u_i = f(z_i) + \epsilon | i=1,2,\ldots,m\}$ ($f(\bullet)$ and $\epsilon$ are unknown). SVGP learns a variational distribution $q(\mathcal{U})$ by maximizing a lower bound of $\log p(y | \mathcal{X})$, where $\log p(y | \mathcal{X}) = \log \int p(y | \mathcal{U}, \mathcal{X}) p(\mathcal{U}) d\mathcal{U}$ and $p(\bullet)$ denotes the probability density under original GP. Trainable hyperparameters during the learning process include values of $z_i$ and hyperparameters of the covariance function of original GP. Given a test point $x_*$, the predictive distribution is then given by $p(y_* | x_*) = \int p(y_* | \mathcal{U}, x_*) q(\mathcal{U}) d\mathcal{U}$, which still follows a Gaussian distribution. One advantage of SVGP is that minibatch training can be applied in case of very large dataset. Suppose the minibatch size is m' and m«m', then for each training step/iteration, the computational complexity is $\mathcal{O}(m'm^2)$, and the space complexity is $\mathcal{O}(m'm)$. Since NNs typically are based on training with relatively large datasets, SVGP makes it practical to implement uncertainty estimates on NNs.

In operation, the RIO process quantifies uncertainty in a NN's predictions. And in the following exemplary point prediction model, RIO calibrates the point predictions of the NN to make them more accurate. Consider a training dataset $\mathcal{D} = (\mathcal{X}, y) = \{(x_i, y_i)\}_{i=1}^n$, and a pretrained standard NN that outputs a point prediction $\hat{y}_i$ given $x_i$. RIO addresses the Uncertainty problem by modeling the residuals between observed outcomers $y$ and NN predictions $\hat{y}$ using GP with a composite kernel. The RIO procedure is captured in Algorithm 1 and described in detail below.

Algorithm 1

Require:

$(\mathcal{X}, y) = \{(x_i, y_i)\}_{i=1}^n$: training data $\hat{y} = \{\hat{y}_i\}_{i=1}^n$: NN predictions on training data $x_*$: data to be predicted $\hat{y}_*$: NN prediction on $x_*$ Ensure:

$\hat{y}'_* \sim \mathcal{N}(\hat{y}_* + \bar{r}_*, \text{var}(\hat{r}_*))$: a distribution of calibrated prediction Training Phase:

1: calculate residuals $r = \{r_i = y_i - \hat{y}_i\}_{i=1}^n$

2: for each optimizer step do

Figure 1B:
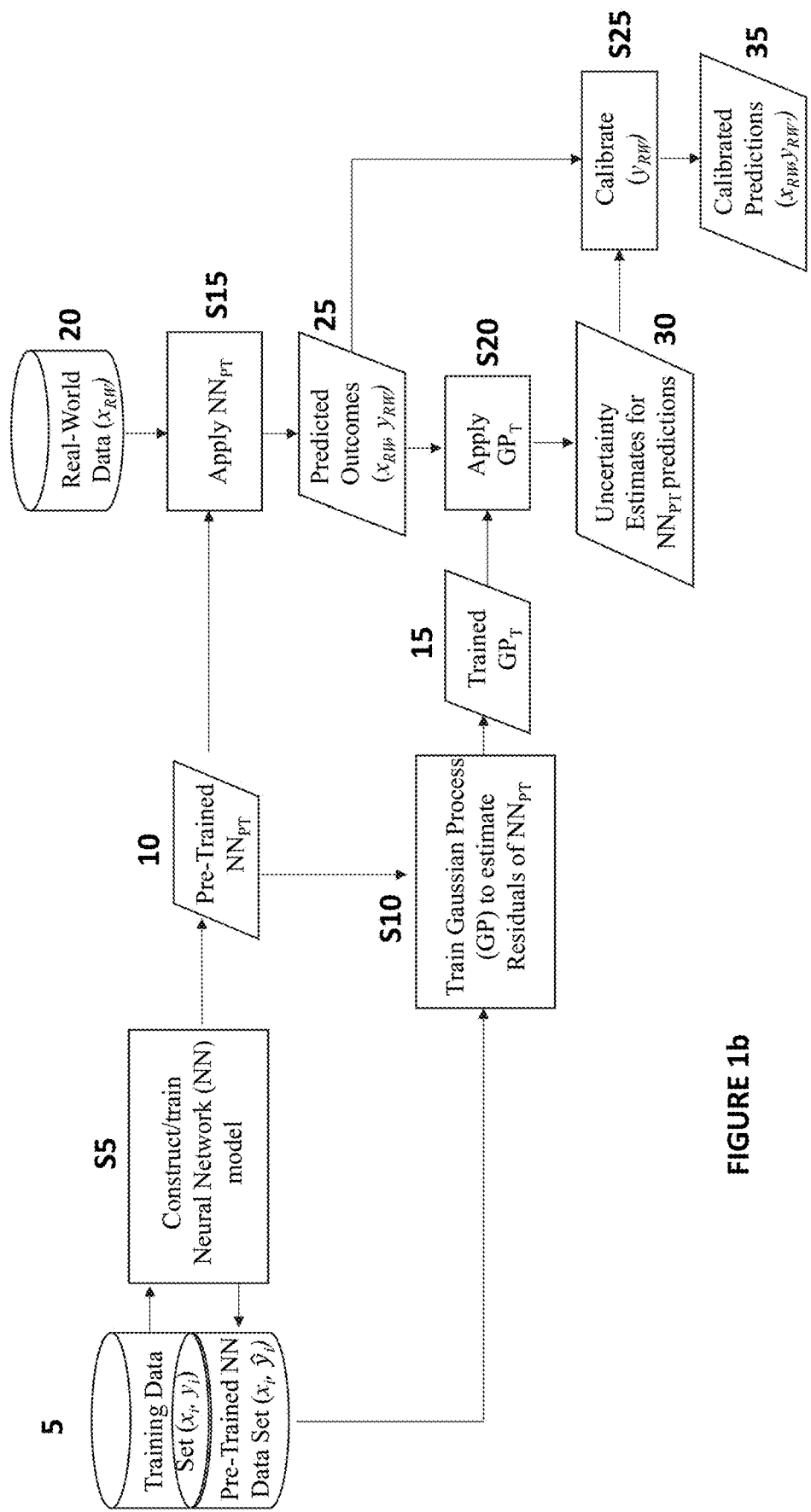

3: calculate covariance matrix $K_c((\mathcal{X}, \hat{y}), (\mathcal{X}, \hat{y}))$, where each entry is given by $k_c((x_i, \hat{y}_i), (x_j, \hat{y}_j)) = k_{in}(x_i, x_j) + k_{out}(\hat{y}_i, \hat{y}_j)$, for i, j = 1, 2, ..., n 4: optimize GP hyperparameters by maximizing log marginal likelihood $\log p(r | \mathcal{X}, \hat{y}) = -\frac{1}{2} r^T (K_c((\mathcal{X}, \hat{y}), (\mathcal{X}, \hat{y})) + \sigma_n^2 I)^{-1} r - \frac{1}{2} \log |K_c((\mathcal{X}, \hat{y})(\mathcal{X}, \hat{y})) + \sigma_n^2 I| n/2 \log 2\pi$ Deployment Phase:

5: calculate residual mean $\bar{r}_* = k_*^T (K_c((\mathcal{X}, \hat{y}), (\mathcal{X} \hat{y})) + \sigma_n^2 I)^{-1} r$ and residual variance $\text{var}(\hat{r}_*) = k_c((x_*, \hat{y}_*), (x_*, \hat{y}_*)) - k_*^T (K_c((\mathcal{X}, \hat{y}), (\mathcal{X}, \hat{y})) + \sigma_n^2 I)^{-1} k_*$ 6: return distribution of calibrated prediction $\hat{y}'_* \sim \mathcal{N}(\hat{y}_* + \bar{r}_*, \text{var}(\hat{r}_*))$ FIG. 1a represents a high level schematic of the overall RIO process when applying the proposed framework in real-world applications. FIG. 1b provides a more detailed flow chart of the RIO process. Referring to FIG. 1b, given a training dataset $(x_i, y_i)$ from one or more databases 5 a standard NN regression model is constructed and trained S5, e.g., by a data scientist. The outcome data set from training is stored in the one or more databases 5. The method next takes this pre-trained model ($NN_{PT}$) 10 and trains a Gaussian process (GP) S10 to estimate the residuals of the neural networks when applied to real world data to make predictions. The training data for training the GP uses both the output of the neural networks, e.g., $(x_i, \hat{y}_i)$, and the original input $(x_i, y_i)$ to produce the trained GP ($GP_T$) 15. These initial pathways are only active during training phase.

In the deployment or real-world application phase, the ($NN_{PT}$) 10 is applied S15 to real-world data ($x_{RW}$) from database 20 and produces predicted outcomes ($x_{RW}, y_{RW}$) 25. The trained GP ($GP_T$) 15 is applied S20 to provide reliable uncertainty estimates 30 for the $NN_{PT}$ predicted outcomes which are then used to calibrate S25 the predictions to provide calibrate predictions ($x_{RW}, Y_{RW}'$) 35. Overall, the RIO method transforms the standard neural network regression model into a reliable probabilistic estimator.

As referenced above, the RIO process can be divided into two phases: the training phase and the deployment phase. In the training phase, the residuals between observed outcomes and NN predictions on the training dataset are calculated as $$r_i = y_i - \hat{y}_i, \text{ for } i=1,2,\ldots,n. \tag{1}$$

Let r denote the vector of all residuals and $\hat{y}$ denote the vector of all NN predictions. A GP with a composite kernel is trained assuming $r \sim \mathcal{N}(0, K_c((\mathcal{X}, \hat{y}), (\mathcal{X}, \hat{y})) + \sigma_n^2 I)$, where $K_c((\mathcal{X}, \hat{y}), (\mathcal{X}, \hat{y}))$ notes an n×n covariance matrix at all pairs of training points based on a composite kernel $$k_c((x_i, \hat{y}_i), (x_j, \hat{y}_j)) = k_{in}(x_i, x_j) + k_{out}(\hat{y}_i, \hat{y}_j), \text{ for } i,j = 1, 2, \ldots, n. \tag{2}$$

Suppose a radial basis function (RBF) kernel is used for both $k_{in}$ and $k_{out}$. Then, $$k_c((x_i, \hat{y}_i), (x_j, \hat{y}_j)) = \sigma_{in}^2 \exp\left(-\frac{1}{2l_{in}^2} \|x_i - x_j\|^2\right) + \sigma_{out}^2 \exp\left(-\frac{1}{2l_{out}^2} \|\hat{y}_i - \hat{y}_j\|^2\right). \tag{3}$$

The training process of GP learns the hyperparameters $\sigma^2_{in}$, $l_{in}$, $\sigma^2_{out}$, $l_{out}$, and $\sigma^2_n$ by maximizing the log marginal likelihood $\log p(r| \mathcal{X}, \hat{y})$ given by $$\log p(r| \mathcal{X}, \hat{y}) = -\tfrac{1}{2} r^T(K_c(z, 41, \hat{y}), (\mathcal{X}, \hat{y})) + \sigma^2_n I)^{-1} r - \tfrac{1}{2} \log |K_c((\mathcal{X}, \hat{y}), (\mathcal{X}, \hat{y})) + \sigma^2_n I| - n/2 \log 2\pi. \quad (4)$$

In the deployment phase, a test point $x_*$ is input to the NN to get an output $\hat{y}_*$. The trained GP predicts the distribution of the residual as $\hat{r}_* | \mathcal{X}, \hat{y}, r, x_*, \hat{y}_* \sim \mathcal{N}(\bar{r}_*, \text{var}(\hat{r}_*))$, where $$\bar{r}_* = K^T_*(K_c((\mathcal{X}, \hat{y}), (\mathcal{X}, \hat{y})) + \sigma^2_n I)^{-1} r, \quad (5)$$

$$\text{var}(\hat{r}_*) = k_c((x_*, \hat{y}_*), (x_*, \hat{y}_*)) - k^T_*(K_c((\mathcal{X}, \hat{y}), (\mathcal{X}, \hat{y})) + \sigma^2_n I)^{-1} k_*, \quad (6)$$

where $k_*$ denotes the vector of kernel-based covariances (i.e., $k_c((x_*, \hat{y}_*), (x_i, \hat{y}_i))$) between $(x_*, \hat{y}_*)$ and the training points.

Recognize that the predicted residuals can also be used to calibrate the point predictions of the NN, so that the final calibrated prediction with uncertainty information is given by $$\hat{y}'_* \sim \mathcal{N}(\hat{y}_* + \bar{r}_*, \text{var}(\hat{r}_*)). \quad (7)$$

In other words, RIO not only adds uncertainty estimation to a standard NN—it also provides a way to calibrate NN predictions, without any modification to its architecture or training.

Figure 2A:
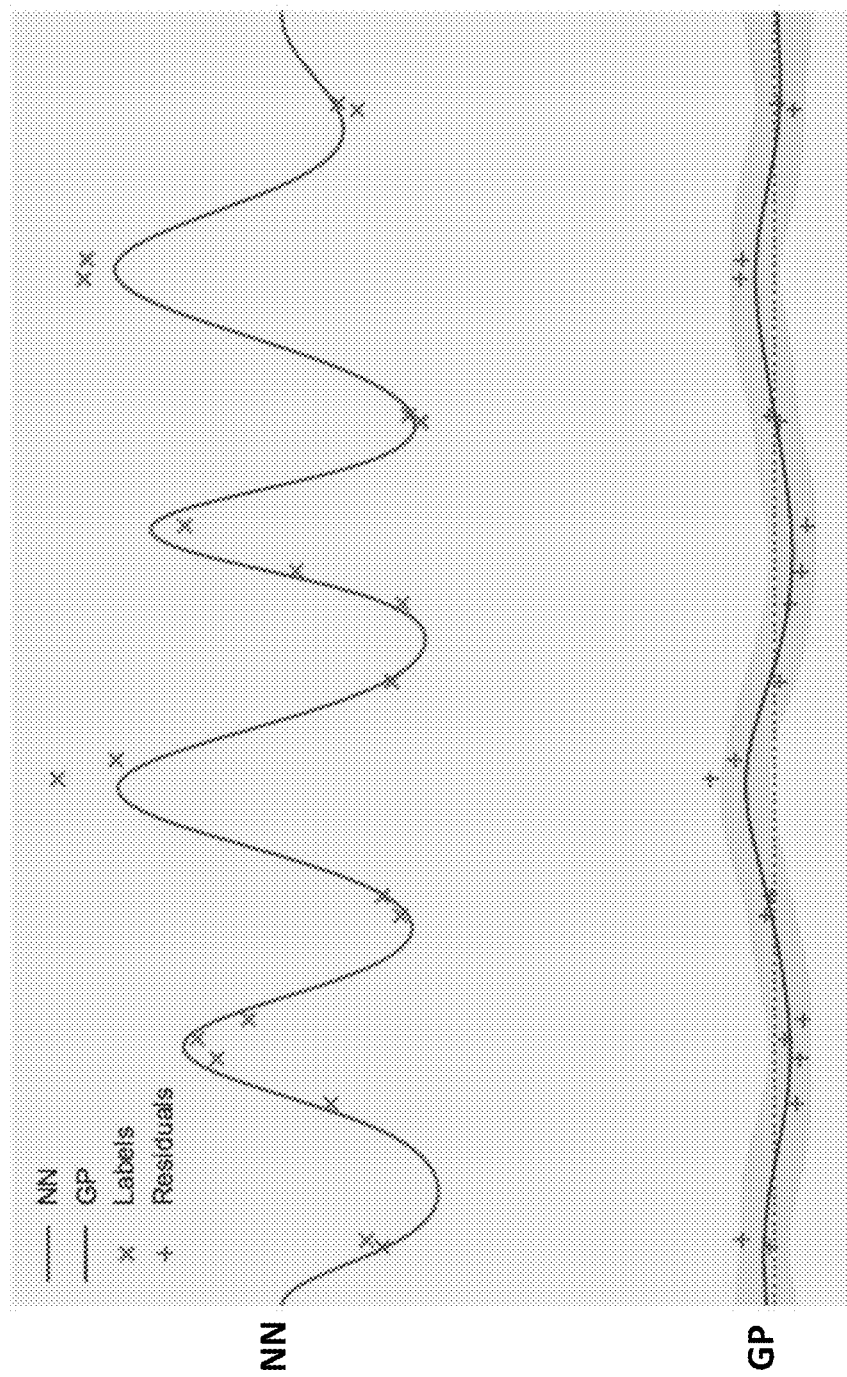
Figure 2B:
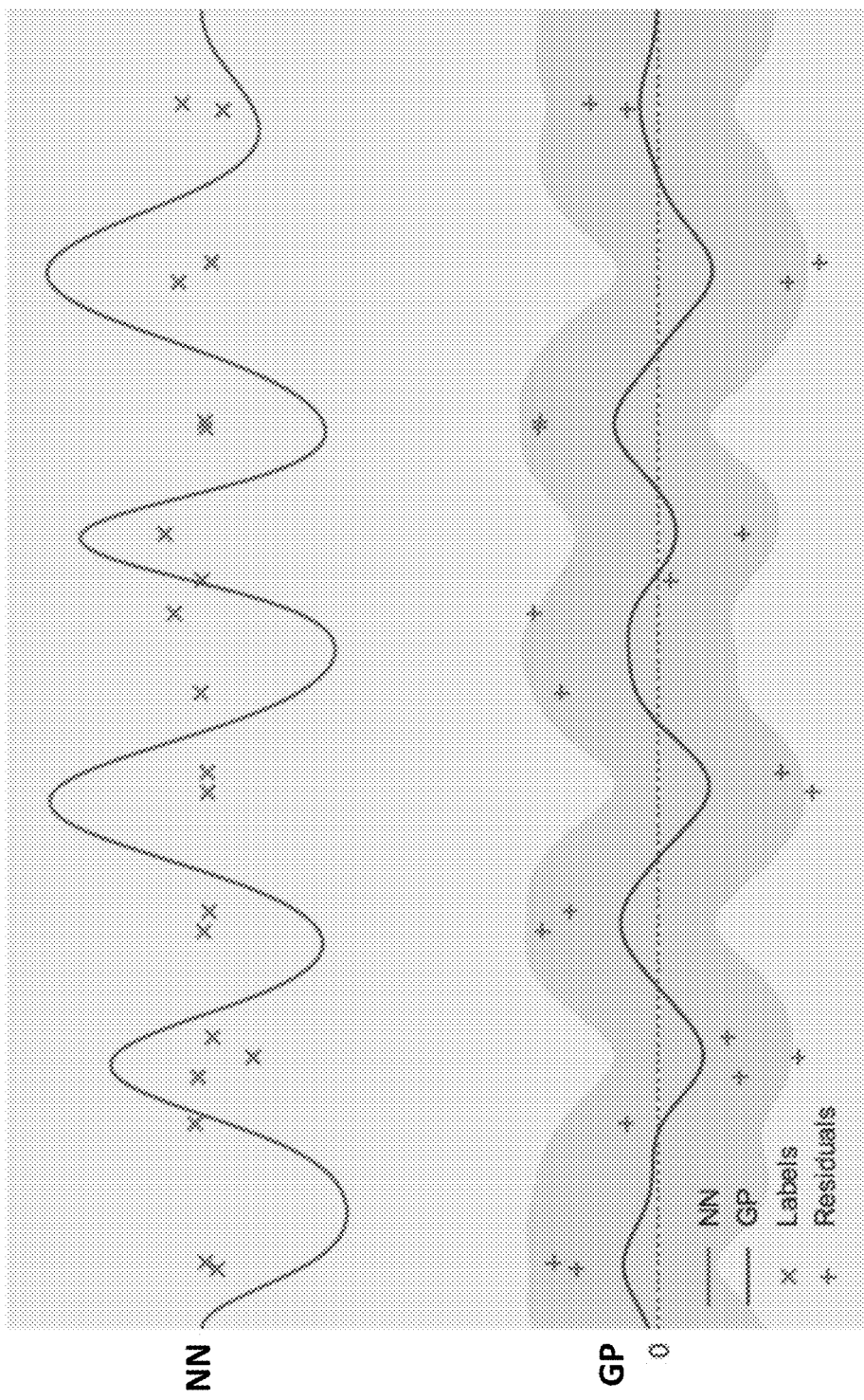
Figure 4A:
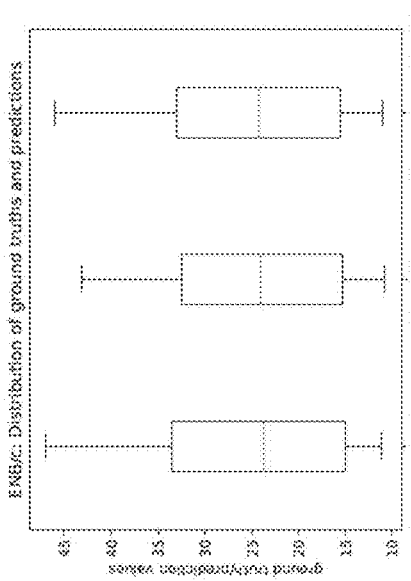
Figure 4B:
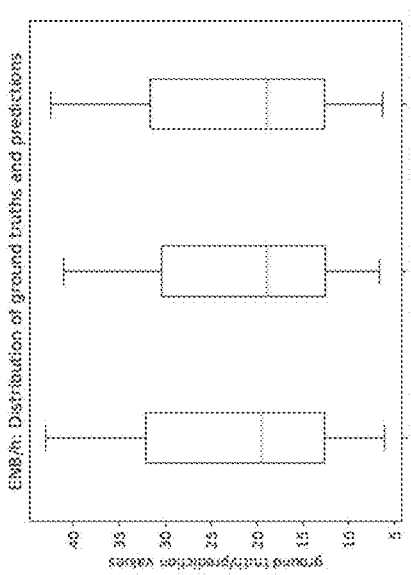
Figure 4C:
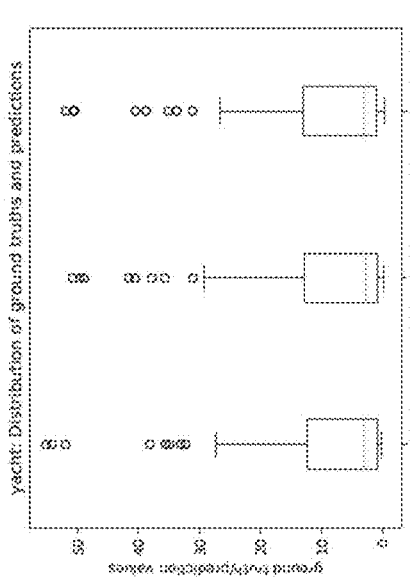
Figure 4D:
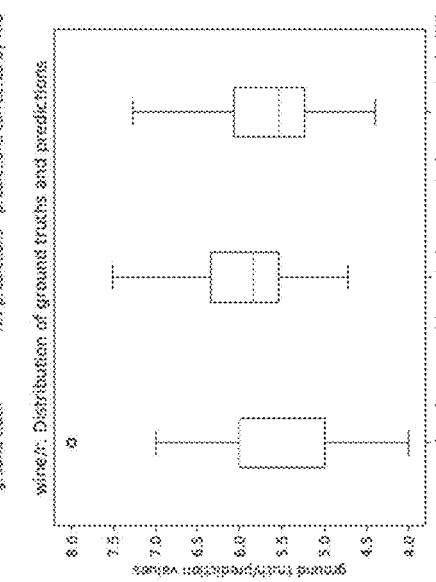
Figure 4E:
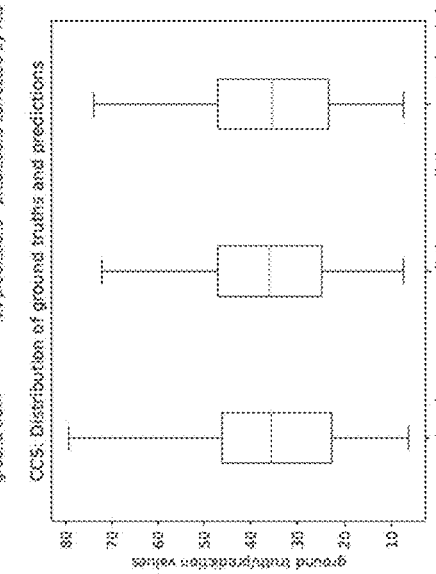
Figure 4F:
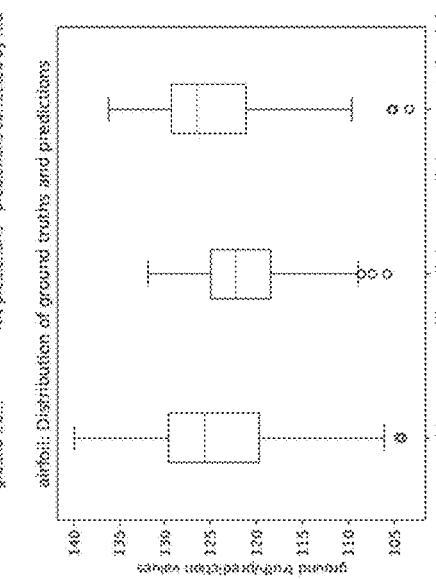
Figure 4G:
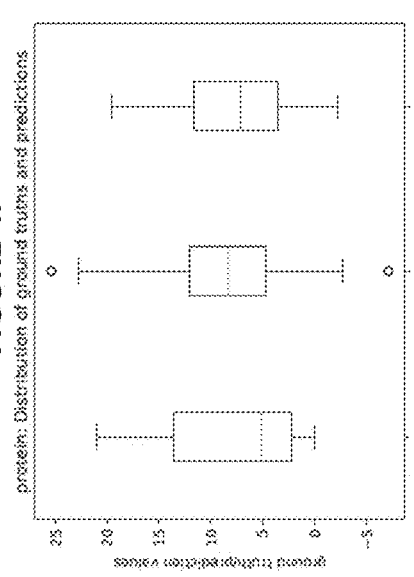
Figure 4H:
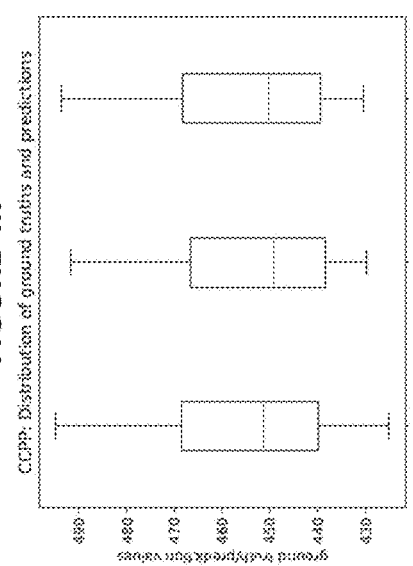
Figure 4I:
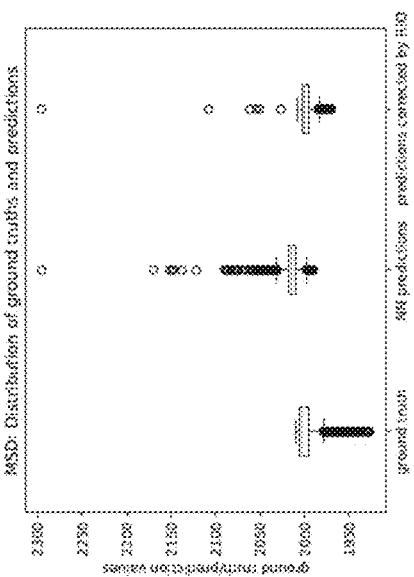
Figure 4J:
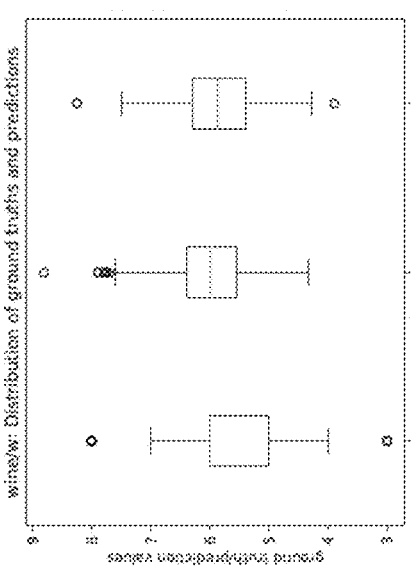
Figure 4K:
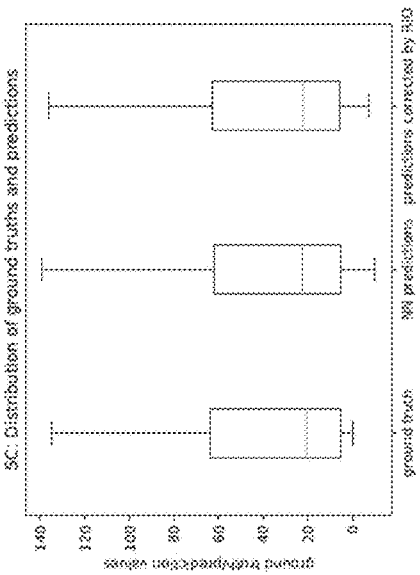
Figure 5A:
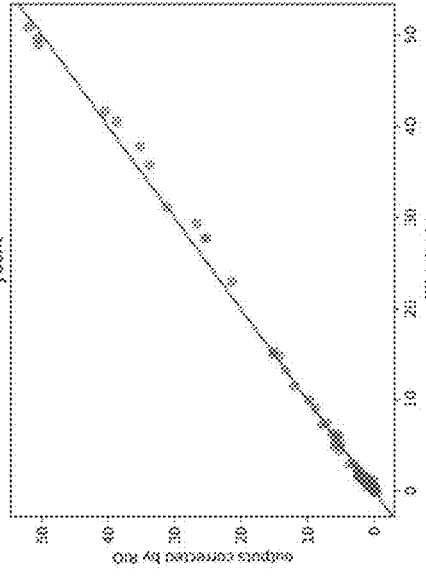
FIGS. 5a -5l show the point-wise comparisons between NN outputs and RIO-corrected outputs for the same experimental runs as in FIGS. 4a -4l.
Figure 5B:
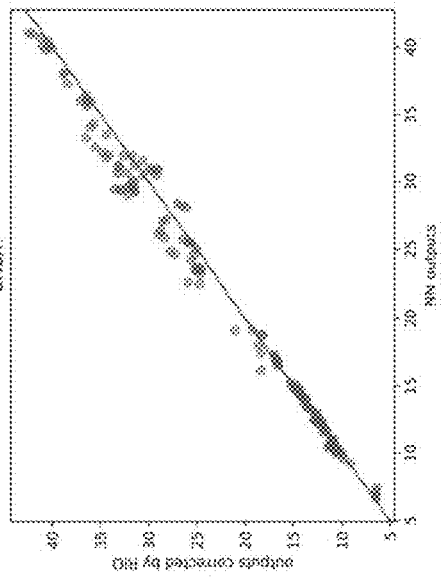
Figure 5C:
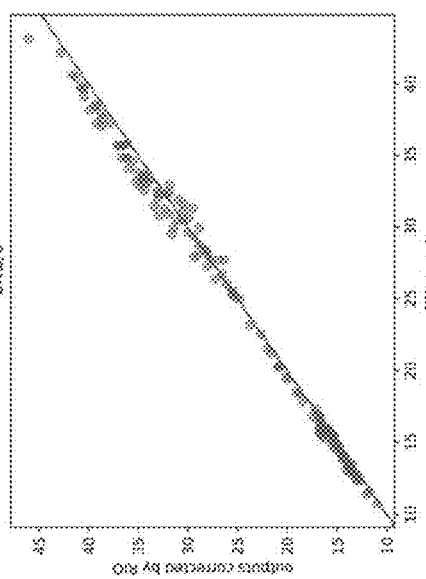
Figure 5D:
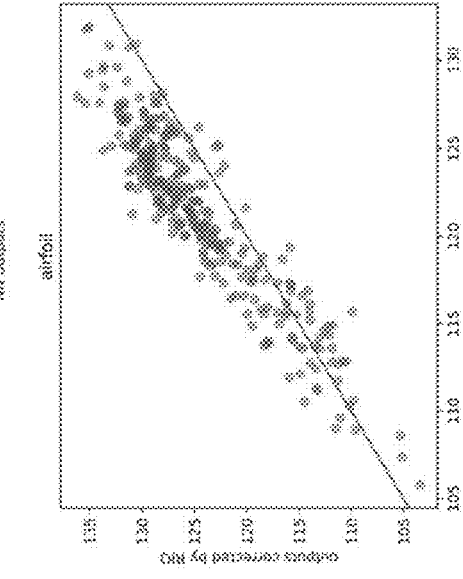
Figure 5E:
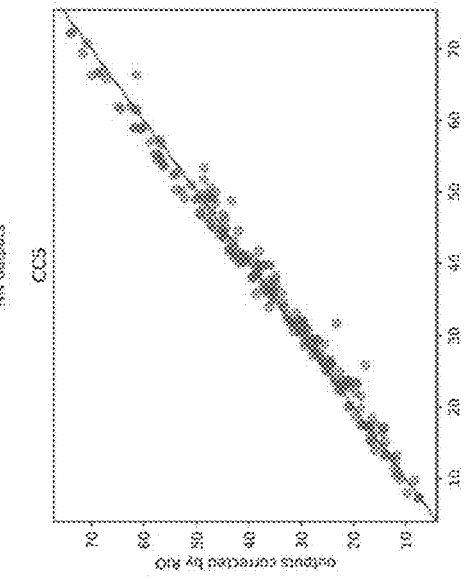
Figure 5F:
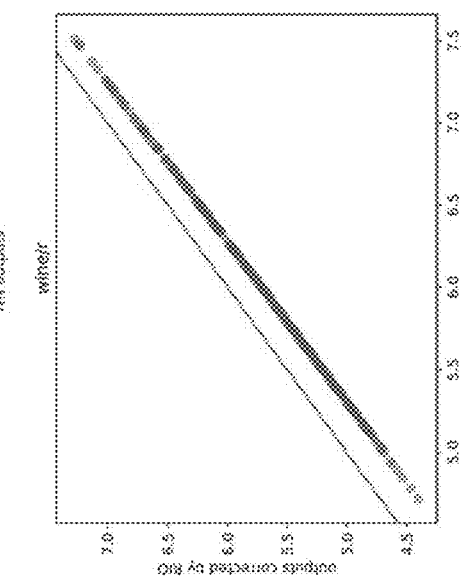
Figure 5I:
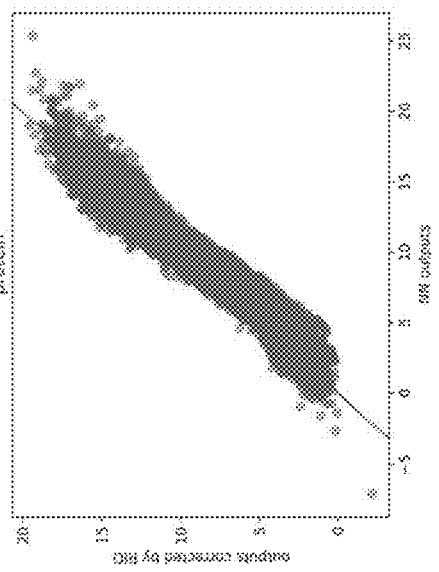
Figure 5H:
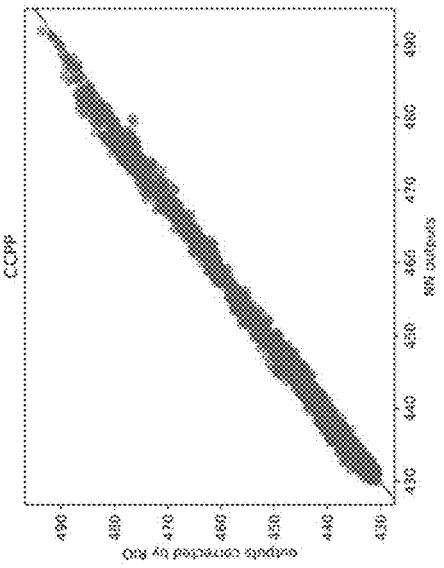
Figure 5G:
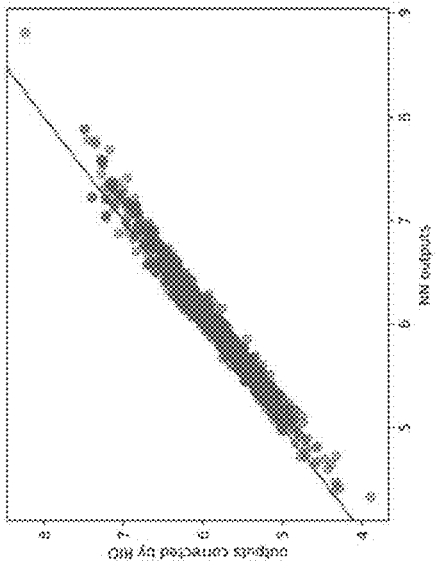
Figure 5L:
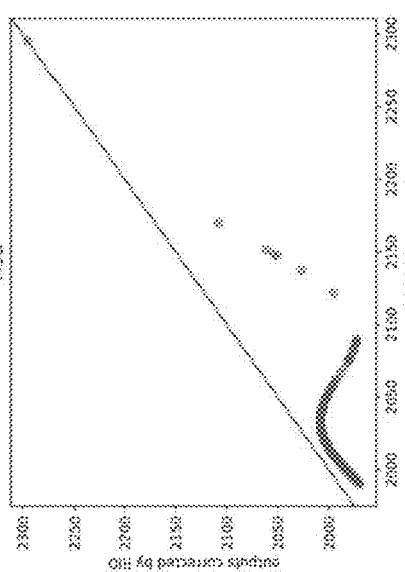
Figure 5K:
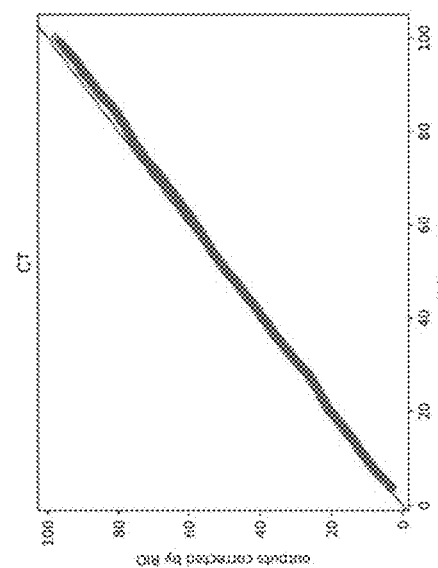
Figure 5J:
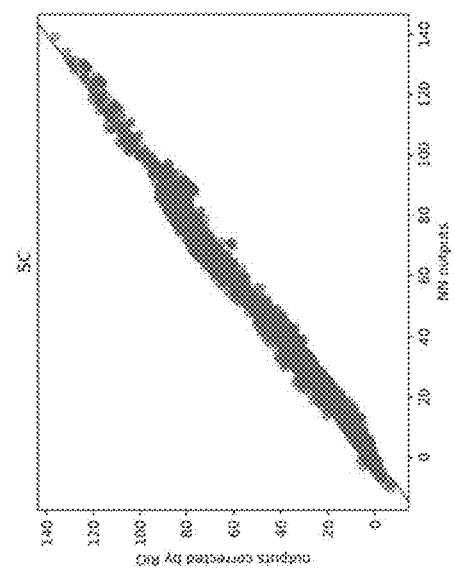

FIGS. 2a and 2b show example behavior of RIO that illustrates the intuition of the approach, wherein the process captures uncertainty of more and less accurate NNs. In FIG. 2a, the neural network has discovered true complex structure in the labels, so the residuals have low variance and are easy for the GP to fit with high confidence. Whereas in FIG. 2b, the ineffective neural network has introduced unnecessary complexity, so the residuals are modeled with high uncertainty. In both cases, RIO matches the intuition for how uncertain the NN really is.

RIO is scalable to large datasets (No. of data points×No. of features>1M) by applying sparse GP methods, e.g., SVGP. Since sparse GP is simply an approximation of the original GP, conclusions to this point remain valid. In the case of applying SVGP with a traditional optimizer, e.g., L-BFGS-B, the computational complexity is $\mathcal{O}(nm^2)$, and space complexity is $\mathcal{O}(nm)$, where n is the number of data points and m is the number of inducing variables, compared to $\mathcal{O}(n^3)$ and $\mathcal{O}(n^2)$ for traditional GP. The computational cost of RIO with SVGP is significantly cheaper than other state-of-the-art approaches.

To appreciate the efficacy and efficiency of the RIO process, comparisons with other algorithms, including algorithms which are known to provide predictive uncertainty, have been generated via experimentation. As discussed and illustrated below, experiments were run to compare nine algorithms on 12 real-world datasets. The algorithms include standard NN, the proposed RIO framework, four ablated variants of RIO (R+I, R+Y, Y+O and Y+IO), and three state-of-the-art models that provide predictive uncertainty: SVGP as described in Hensman et al., Gaussian processes for big data, In Proceedings of the Twenty-Ninth Conference on Uncertainty in Artificial Intelligence, UAI'13, pp. 282-290, (2013) (Hensman et al., 2013), which is incorporated herein by reference; Neural Network Gaussian Process (NNGP) as described in Lee et al., Deep neural networks as gaussian processes, International Conference on Learning Representations, (2018) (Lee et al., 2018), which is incorporated herein by reference; and Attentive Neural Processes (ANP) as described in Kim et al., Attentive neural processes, CoRR, abs/1901.05761 (2019) (Kim et al., 2019), which is incorporated herein by reference.

In naming the RIO variants, "R" means estimating NN residuals then correcting NN outputs, "Y" means directly estimating outcomes, "I" means only using input kernel, "O" means only using output kernel, and "IO" means using I/O kernel. For all RIO variants (including full RIO), SVGP is used as the GP component, but using the appropriate kernel and prediction target. Therefore, "Y+I" amounts to original SVGP, and it is denoted as "SVGP" in all the experimental results.

All 12 datasets are real-world regression problems, and cover a wide variety of dataset sizes and feature dimensionalities as summarized in Table 1.

TABLE 1

| abbreviation | full name in UCI ML repository | dataset size | dimension | note |
|---|---|---|---|---|
| yacht | Yacht Hydrodynamics Data Set | 308 | 6 | — |
| ENB/h | Energy efficiency | 768 | 8 | Heating Load as target |
| ENB/c | Energy efficiency | 768 | 8 | Cooling Load as target |
| airfoil | Airfoil Self-Noise | 1505 | 5 | — |
| CCS | Concrete Compressive Strength | 1030 | 8 | — |
| wine/r | Wine Quality | 1599 | 11 | only use winequality-red data |
| wine/w | Wine Quality | 4898 | 11 | only use winequality-white data |
| CCPP | Combined Cycle Power Plant | 9568 | 4 | — |
| CASP | Physicochemical Properties of Protein Tertiary Structure | 54730 | 9 | — |
| SC | Superconductivity Data | 21263 | 81 | — |
| CT | Relative location of CT slices on axial axis | 53500 | 384 | — |
| MSD | YearPredictionMSD | 515345 | 90 | train: first 463715, test: last 51630 |

For the experimental runs, various parametric setups for certain algorithms are described herein.

Neural Network (NN)

For the SC dataset, a fully connected feed-forward NN with 2 hidden layers, each with 128 hidden neurons, is used. For the CT dataset, a fully connected feed-forward NN with 2 hidden layers, each with 256 hidden neurons, is used. For the MSD dataset, a fully connected feed-forward NN with 4 hidden layers, each with 64 hidden neurons, is used. And for all the remaining datasets, a fully connected feed-forward NN with 2 hidden layers, each with 64 hidden neurons, is used. The inputs to the NN are normalized to have mean 0 and standard deviation 1. The activation function is ReLU for all the hidden layers. The maximum number of epochs for training is 1000. Twenty percent (20%) of the training data is used as validation data, and the split is random at each independent run. An early stop is triggered if the loss on validation data has not be improved for 10 epochs. The optimizer is RMSprop with learning rate 0.001, and the loss function is mean squared error (MSE).

RIO, RIO Variants and SVGP

Per Hensman et al., 2013, SVGP is used as an approximator to original GP in RIO and all the RIO variants. For RIO, RIO variants and SVGP, the number of inducing points are 50 for all the experiments. RBF kernel is used for both input and output kernel. For RIO, RIO variants and SVGP, the signal variances and length scales of all the kernels plus the noise variance are the trainable hyperparameters. The optimizer is L-BFGS-B with default parameters as is described in the Scipy.optimize documentation available from SciPy.org at the time of filing and based on the description in R. H. Byrd, et al., A Limited Memory Algorithm for Bound Constrained Optimization, (1995), SIAM Journal on Scientific and Statistical Computing, 16, 5 pp. 1190-1208 The maximum number of iterations is set as 1000. The training process runs until the L-BFGS-B optimizer decides to stop.

NNGP

For NNGP kernel, the depth is 2, and the activation function is ReLU. $n_g=101$, $n_v=151$, and $n_c=131$. Following the learning process in original paper, a grid search is performed to search for the best values of $\sigma_w^2$ and $\sigma_b^2$. As in Lee et al., 2018, a grid of 30 points evenly spaced from 0.1 to 5.0 (for $\sigma_w^2$) and 30 points evenly spaced from 0 to 2.0 (for $\sigma_b^2$) was evaluated. The noise variance $\sigma_\epsilon^2$ is fixed as 0.01. The grid search process stops when Cholesky decomposition fails or all the 900 points are evaluated. The best values found during the grid search will be used in the experiments. No pre-computed lookup tables are utilized.

ANP

The parametric setups of ANP are following the recommendations in Kim et al., 2019. The attention type is multihead, the hidden size is 64, the max number of context points is 50, the context ratio is 0.8, the random kernel hyperparameters option is on. The size of latent encoder is 64×64×64×64, the number of latents is 64, the size of deterministic encoder is 64×64×64×64, the size of decoder is 64×64×64×64×2, and the deterministic path option is on. Adam optimizer with learning rate $10^{-4}$ is used, and the maximum number of training iterations is 2000.

Except for the "MSD" dataset, all other datasets are tested for 100 independent runs. During each run, the dataset is randomly split into training set, validation set, and test set, and all algorithms are trained on the same split. All RIO variants that involve an output kernel or residual estimation are based on the trained NN in the same run. For "MSD", since the dataset split is strictly predefined by the provider, only 10 independent runs are conducted. NNGP and ANP are only tested on the four smallest dataset (based on the product of dataset size and feature dimensionality) because they do not scale well to larger datasets. It is notable that for all the RIO variants, no extensive hyperparameter tuning is conducted; the same default setup is used for all experiments, i.e., standard RBF kernel and 50 inducing points.

Table 2 summarizes the numerical results from these experiments. To measure the point-prediction error, the Root Mean Square Error (RMSE) between the method predictions and true outcomes on test datasets are calculated for each independent experimental run. After that, the mean and standard deviations of these RMSEs are used to measure the performance of the algorithms.

TABLE 2

| Dataset n × d | Method | RMSE mean ± std | NLPD mean ± std | Noise Variance | Time (sec) |
|---|---|---|---|---|---|
| yacht 308 × 6 | NN | 2.30 ± 0.93†‡ | — | — | 4.02 |
| | RIO | 1.46 ± 0.49 | 2.039 ± 0.762†‡ | 0.82 | 7.16 |
| | R + I | 2.03 ± 0.73†‡ | 2.341 ± 0.516†‡ | 2.54 | 4.30 |
| | R + O | 1.88 ± 0.66†‡ | 2.305 ± 0.614†‡ | 1.60 | 6.27 |
| | Y + O | 1.86 ± 0.64†‡ | 2.305 ± 0.639†‡ | 1.89 | 9.93 |
| | Y + IO | 1.58 ± 0.52†‡ | 2.160 ± 0.773†‡ | 1.18 | 9.44 |
| | SVGP | 4.42 ± 0.62†‡ | 2.888 ± 0.102†‡ | 18.56 | 8.96 |
| | NNGP | 12.40 ± 1.45†‡ | 35.18 ± 0.534†‡ | — | 7347 |
| | ANP | 7.59 ± 3.20 | 1.793 ± 0.887†‡ | — | 40.82 |
| ENB/c 768 × 8 | NN | 1.88 ± 0.44†‡ | — | — | 6.45 |
| | RIO | 1.48 ± 0.33 | 1.816 ± 0.191 | 1.58 | 8.07 |
| | R + I | 1.71 ± 0.44†‡ | 1.969 ± 0.236†‡ | 2.22 | 5.02 |
| | R + O | 1.75 ± 0.43†‡ | 2.000 ± 0.229†‡ | 2.25 | 4.57 |
| | Y + O | 1.76 ± 0.43†‡ | 2.000 ± 0.231†‡ | 2.32 | 10.99 |
| | Y + IO | 1.64 ± 0.36†‡ | 1.936 ± 0.210†‡ | 1.96 | 10.56 |
| | SVGP | 2.63 ± 0.23†‡ | 2.403 ± 0.078†‡ | 6.81 | 10.28 |
| | NNGP | 4.91 ± 0.32†‡ | 30.14 ± 0.886†‡ | — | 7704 |
| | ANP | 4.81 ± 2.15†‡ | 2.698 ± 0.548†‡ | — | 64.11 |
| CCS 1030 × 8 | NN | 6.23 ± 0.53†‡ | — | — | 9.46 |
| | RIO | 5.97 ± 0.48 | 3.241 ± 0.109†‡ | 24.74 | 13.71 |
| | R + I | 6.01 ± 0.50†‡ | 3.248 ± 0.112†‡ | 25.40 | 9.52 |
| | R + O | 6.17 ± 0.54†‡ | 3.283 ± 0.120†‡ | 26.31 | 9.54 |
| | Y + O | 6.15 ± 0.52†‡ | 3.279 ± 0.117†‡ | 26.53 | 21.35 |
| | Y + IO | 6.06 ± 0.49†‡ | 3.261 ± 0.110†‡ | 25.82 | 23.15 |
| | SVGP | 6.87 ± 0.39†‡ | 3.336 ± 0.048†‡ | 44.55 | 19.85 |

TABLE 2-continued

| Dataset n × d | Method | RMSE mean ± std | NLPD mean ± std | Noise Variance | Time (sec) |
|---|---|---|---|---|---|
| wine/w 4898 × 11 | NN | 0.721 ± 0.023†‡ | — | — | 7.17 |
| | RIO | 0.704 ± 0.018 | 1.090 ± 0.038†‡ | 0.37 | 16.74 |
| | R + I | 0.699 ± 0.018†‡ | 1.081 ± 0.037†‡ | 0.38 | 13.5 |
| | R + O | 0.710 ± 0.019†‡ | 1.098 ± 0.038†‡ | 0.39 | 6.19 |
| | Y + O | 0.710 ± 0.019†‡ | 1.096 ± 0.038†‡ | 0.39 | 18.39 |
| | Y + IO | 0.705 ± 0.019†‡ | 1.090 ± 0.038 | 0.38 | 20.06 |
| | SVGP | 0.719 ± 0.018†‡ | 1.081 ± 0.022†‡ | 0.50 | 18.18 |
| protein 45730 × 9 | NN | 4.21 ± 0.07†‡ | — | — | 151.8 |
| | RIO | 4.08 ± 0.06 | 2.826 ± 0.014 | 15.71 | 149.4 |
| | R + I | 4.11 ± 0.06†‡ | 2.834 ± 0.037†‡ | 15.99 | 141.2 |
| | R + O | 4.14 ± 0.06†‡ | 2.840 ± 0.015†‡ | 16.18 | 115.1 |
| | Y + O | 4.14 ± 0.06†‡ | 2.840 ± 0.015†‡ | 16.17 | 138.4 |
| | Y + IO | 4.08 ± 0.06 | 2.826 ± 0.014 | 15.72 | 155.5 |
| | SVGP | 4.68 ± 0.04†‡ | 2.963 ± 0.007†‡ | 22.54 | 149.5 |
| CT 53500 × 384 | NN | 1.17 ± 0.34†‡ | — | — | 194.5 |
| | RIO | 0.88 ± 0.15 | 1.284 ± 0.219 | 1.02 | 516.4 |
| | R + I | 1.17 ± 0.34†‡ | 1.538 ± 0.289†‡ | 1.71 | 19.80 |
| | R + O | 0.88 ± 0.15 | 1.283 ± 0.219‡ | 1.02 | 159.4 |
| | Y + O | 0.99 ± 0.42†‡ | 1.365 ± 0.385†‡ | 2.45 | 168.2 |
| | Y + IO | 0.91 ± 0.16†‡ | 1.280 ± 0.177‡ | 0.62 | 578.6 |
| | SVGP | 52.07 ± 0.19†‡ | 5.372 ± 0.004†‡ | 2712 | 27.56 |
| ENB/h 768 × 8 | NN | 1.03 ± 0.51†‡ | — | — | 6.65 |
| | RIO | 0.70 ± 0.38 | 1.038 ± 0.355 | 0.46 | 8.18 |
| | R + I | 0.79 ± 0.46†‡ | 1.147 ± 0.405†‡ | 0.63 | 7.52 |
| | R + O | 0.80 ± 0.43†‡ | 1.169 ± 0.388†‡ | 0.59 | 7.61 |
| | Y + O | 0.88 ± 0.48†‡ | 1.248 ± 0.405†‡ | 0.75 | 11.06 |
| | Y + IO | 0.76 ± 0.41†‡ | 1.124 ± 0.368†‡ | 0.56 | 10.64 |
| | SVGP | 2.13 ± 0.18†‡ | 2.200 ± 0.074†‡ | 4.70 | 10.16 |
| | NNGP | 4.97 ± 0.29†‡ | 32.40 ± 0.638†‡ | — | 7374 |
| | ANP | 4.08 ± 2.27†‡ | 2.475 ± 0.559†‡ | — | 102.3 |
| airfoil 1505 × 5 | NN | 4.82 ± 0.43†‡ | — | — | 6.48 |
| | RIO | 3.07 ± 0.18 | 2.554 ± 0.053 | 9.48 | 17.63 |
| | R + I | 3.16 ± 0.18†‡ | 2.583 ± 0.051†‡ | 10.07 | 15.90 |
| | R + O | 4.17 ± 0.26†‡ | 2.849 ± 0.066†‡ | 16.64 | 9.97 |
| | Y + O | 4.24 ± 0.28†‡ | 2.869 ± 0.075†‡ | 17.81 | 22.72 |
| | Y + IO | 3.64 ± 0.53†‡ | 2.712 ± 0.150†‡ | 14.40 | 24.51 |
| | SVGP | 3.59 ± 0.20†‡ | 2.699 ± 0.053†‡ | 12.67 | 21.74 |
| | NNGP | 6.54 ± 0.23†‡ | 33.60 ± 0.420†‡ | — | 3355 |
| | ANP | 21.17 ± 30.72†‡ | 5.399 ± 6.316†‡ | — | 231.7 |
| wine/r 1599 × 11 | NN | 0.691 ± 0.041†‡ | — | — | 3.61 |
| | RIO | 0.672 ± 0.036 | 1.094 ± 0.100 | 0.28 | 9.25 |
| | R + I | 0.669 ± 0.036†‡ | 1.085 ± 0.097†‡ | 0.28 | 8.34 |
| | R + O | 0.676 ± 0.035†‡ | 1.099 ± 0.094‡ | 0.29 | 5.02 |
| | Y + O | 0.676 ± 0.034†‡ | 1.096 ± 0.092 | 0.29 | 12.71 |
| | Y + IO | 0.672 ± 0.036†‡ | 1.094 ± 0.098 | 0.28 | 12.48 |
| | SVGP | 0.642 ± 0.028†‡ | 0.974 ± 0.042†‡ | 0.40 | 12.17 |
| CCPP 9568 × 4 | NN | 4.96 ± 0.53†‡ | — | — | 14.52 |
| | RIO | 4.05 ± 0.128 | 2.818 ± 0.031 | 16.30 | 42.65 |
| | R + I | 4.06 ± 0.13†‡ | 2.822 ± 0.031†‡ | 16.39 | 39.88 |
| | R + O | 4.32 ± 0.15†‡ | 2.883 ± 0.035†‡ | 18.50 | 18.48 |
| | Y + O | 4.37 ± 0.20†‡ | 2.914 ± 0.122†‡ | 23.98 | 48.27 |
| | Y + IO | 4.56 ± 1.00†‡ | 2.958 ± 0.216†‡ | 31.06 | 46.8 |
| | SVGP | 4.36 ± 0.13†‡ | 2.893 ± 0.031†‡ | 19.04 | 46.43 |
| SC 21263 × 81 | NN | 12.23 ± 0.77†‡ | — | — | 51.9 |
| | RIO | 11.28 ± 0.46 | 3.853 ± 0.042 | 105.83 | 53.39 |
| | R + I | 11.33 ± 0.45†‡ | 3.858 ± 0.041†‡ | 107.35 | 47.72 |
| | R + O | 11.63 ± 0.52†‡ | 3.881 ± 0.046†‡ | 112.91 | 30.47 |
| | Y + O | 11.64 ± 0.53†‡ | 3.882 ± 0.046†‡ | 113.61 | 45.35 |
| | Y + IO | 11.32 ± 0.45†‡ | 3.856 ± 0.041†‡ | 106.93 | 57.74 |
| | SVGP | 14.66 ± 0.25†‡ | 4.136 ± 0.014†‡ | 239.28 | 50.89 |
| MSD 515345 × 90 | NN | 12.42 ± 2.97†‡ | — | — | 1136 |
| | RIO | 9.26 ± 0.21 | 3.639 ± 0.022 | 84.28 | 1993 |
| | R + I | 10.92 ± 1.30†‡ | 3.811 ± 0.128†‡ | 135.34 | 282.0 |
| | R + O | 9.25 ± 0.20 | 3.638 ± 0.021 | 84.05 | 1518 |
| | Y + O | 10.00 ± 0.86†‡ | 3.768 ± 0.148†‡ | 169.90 | 1080 |
| | Y + IO | 9.43 ± 0.52‡ | 3.644 ± 0.025†‡ | 85.66 | 2605 |
| | SVGP | 9.57 ± 0.00†‡ | 3.677 ± 0.000†‡ | 92.21 | 2276 |

In Table 2, the symbols † and ‡ indicate that the difference between the marked entry and RIO is statistically significant at the 5% significance level using paired t-test and Wilcoxon test, respectively. The best entries that are significantly better than all the others under at least one statistical test are marked in boldface (ties are allowed).

The errors between point predictions of models and true outcomes of test points are measured using Root Mean Square Error (RMSE); the mean and standard deviation of RMSEs over multiple experimental runs are shown in Table 2. For models that return a probabilistic distribution, the mean of the distribution is the point prediction. Although the main motivation of RIO is to enhance pretrained NN rather than construct a new state-of-the-art prediction model from scratch, RIO performs the best or equals the best method (based on statistical tests) in 10 out of 12 datasets. RIO significantly outperforms original NN in all 12 datasets, while original SVGP performs significantly worse than NN in 7 datasets. For the CT dataset, which has 386 input features, SVGP fails severely since the input kernel cannot capture the implicit correlation information. ANP is unstable on the airfoil dataset because it scales poorly with dataset size.

FIGS. 3(a)-3(l) compare NN, RIO and SVGP in terms of prediction RMSE for each dataset. The horizontal axis in each graph denotes the prediction RMSE of the NN, and the vertical axis denotes the prediction RMSE of RIO (blue dots) and SVGP (orange dots). Each dot represents an independent experimental run. Since the scales are different, the solid blue line indicates where NN and RIO/SVGP have same prediction RMSE. Thus, a dot below the line means that the method (RIO or SVGP) performs better than the NN, and vice versa. Results of SVGP on the CT dataset are not plotted because its prediction RMSE exceeded the visible scale (i.e. they were >50). As indicated, RIO consistently reduces the error of the NN, and outperforms SVGP in most cases. RIO is able to improve the NN predictions consistently regardless of how the dataset is split and how well the NN is trained. Even in the situations where original NN is much worse than SVGP, RIO still successfully improves the NN performance into a level that is comparable or better than SVGP. RIO exhibits diverse behaviors that generally move the original NN predictions closer to the ground truth.

FIGS. 4a-4l plot the distributions of ground truth labels (outcomes), original NN predictions and predictions corrected after RIO for a randomly picked run for each dataset. FIGS. 5a-5l show the point-wise comparisons between NN outputs and RIO-corrected outputs for the same experimental runs as in FIGS. 4a-4l. Based on the results, it is clear that RIO tends to calibrate each NN prediction accordingly. The distribution of outputs after RIO calibration may be a shift, or shrinkage, or expansion, or even more complex modifications of the original NN predictions, depending on how different are NN predictions from ground truths. As a result, the distribution of RIO calibrated outputs are closer to the distribution of the ground truth. One interesting behavior can be observed in FIG. 4i for "protein" dataset: after applying RIO, the range of whiskers shrunk and the outliers disappeared, but the box (indicating 25 to 75 percentile of the data) expanded. This behavior shows that RIO can customize its calibration to each point. Another interesting behavior is that for "wine/r" dataset (see both FIG. 4f and FIG. 5f), RIO shifts all the original NN outputs to lower values, which are closer to the distribution of the ground truth.

Negative log predictive density (NLPD) is used to quantitatively measure the quality of uncertainty estimation, which favors conservative models, but also effectively penalizes both over- and under-confident predictions. NLPD is given by $$L = -\frac{1}{n}\sum_{i=1}^{n} \log p(\hat{y}_i = y_i | x_i) \quad (8)$$

where $\hat{y}_i$ indicates the prediction results, $x_i$ is the input with true associated outcome $y_i$, $p(\cdot)$ is the probability density function (PDF) of the returned distribution based on input $x_i$.

The mean and standard deviation of NLPDs over multiple experimental runs are shown in Table 2 (lower is better). RIO performs the best or equals the best method (based on statistical tests) in 8 out of 12 datasets. NNGP always yields a high NLPD; it returns over-confident predictions, because it does not include noise estimation in its original implementation. For the yacht dataset, ANP achieves the best NLPD, but with high RMSE. This is because ANP is able to correctly return high predictive variance when its prediction error is high. For all other tested datasets, RIO variants consistently outperform ANP. Among all RIO variants, the full RIO provides the most reliable overall predictive uncertainty. The conclusion is that RIO successfully extracts useful uncertainty information from NN predictions.

To compare the computation time of the algorithms, the training time (wall clock time) of NN, RIO, all the ablated RIO variants, SVGP and ANP are averaged over all the independent runs as the computation time. The computation time of all RIO variants does not include the training time of associated NN, because the NN is considered to be pretrained. For NNGP, the wall clock time for the grid search is used. In case that the grid search stops due to Cholesky decomposition failures, the computation time of NNGP will be estimated as the average running time of all the successful evaluations ×900, which is the supposed number of evaluations. All the algorithms are implemented using an open source machine learning platform e.g., Tensorflow, and tested in the identical python environment. All the experiments are running on a machine with 16 Intel® Xeon® CPU E5-2623 v4@2.60 GHz and 128 GB memory. As one skilled in the art recognizes, other machine learning platforms, programming languages and hardware/processing capabilities may be used to implement the underlying process.

Table 2 shows the average wall clock time of each algorithm. All algorithms are implemented using Tensorflow under the same running environment as indicated above. The RIO variants scale well to increasing dataset sizes and feature dimensionalities. L-BFGS-B converges especially quickly for R+I on the three highest dimensional datasets, presumably because the residuals are very well-behaved compared to the raw targets or NN output. In contrast, ANP's computation time increases significantly with the scale of the dataset, and NNGP always needs very expensive computational budgets due to its costly grid search of hyperparameters.

Additional comparisons between performance of the RIO variants and other algorithms confirms the efficacy of residual estimation and the contribution of I/O kernel to the robustness of the RIO solution. RIO variants with residual estimation generally perform better than its counterparts in both point-prediction error and uncertainty estimation, thus confirming the effectiveness of residual estimation. Further, as indicated, Y+IO outperforms both Y+I (SVGP) and Y+O in most cases across all performance metrics, and RIO generally provides better performance than R+I and R+O in all respects. This result, in turn, confirms that the I/O kernel provides additional robustness. Both residual estimation and the I/O kernel contribute substantially to the performance of the framework.

To investigate the behaviors of RIO variants during learning, the mean of estimated noise variance $\sigma_n^2$ over all the independent runs were calculated. Using Spearman's Rank Correlation between RMSE and $\sigma_n^2$, a correlation value larger than 0.8 and p-value less than 0.05 indicate a very strong positive monotonic correlation. As shown for 10 out of 12 datasets, very strong positive monotonic correlation between RMSE and noise variance was observed as shown in Table 3.

TABLE 3

|  | yacht | ENB/h | ENB/c | airfoil | CCS | wine/r | wine/w | CCPP | protein | SC | CT | MSD |
|---|---|---|---|---|---|---|---|---|---|---|---|---|
| Corr. | 0.943 | 0.943 | 1.0 | 1.0 | 0.943 | −0.09 | 0.886 | 1.0 | 0.943 | 1.0 | 0.771 | 0.943 |
| p-value | 0.005 | 0.005 | 0.0 | 0.0 | 0.005 | 0.872 | 0.02 | 0.0 | 0.005 | 0.0 | 0.072 | 0.005 |

Figure 6:
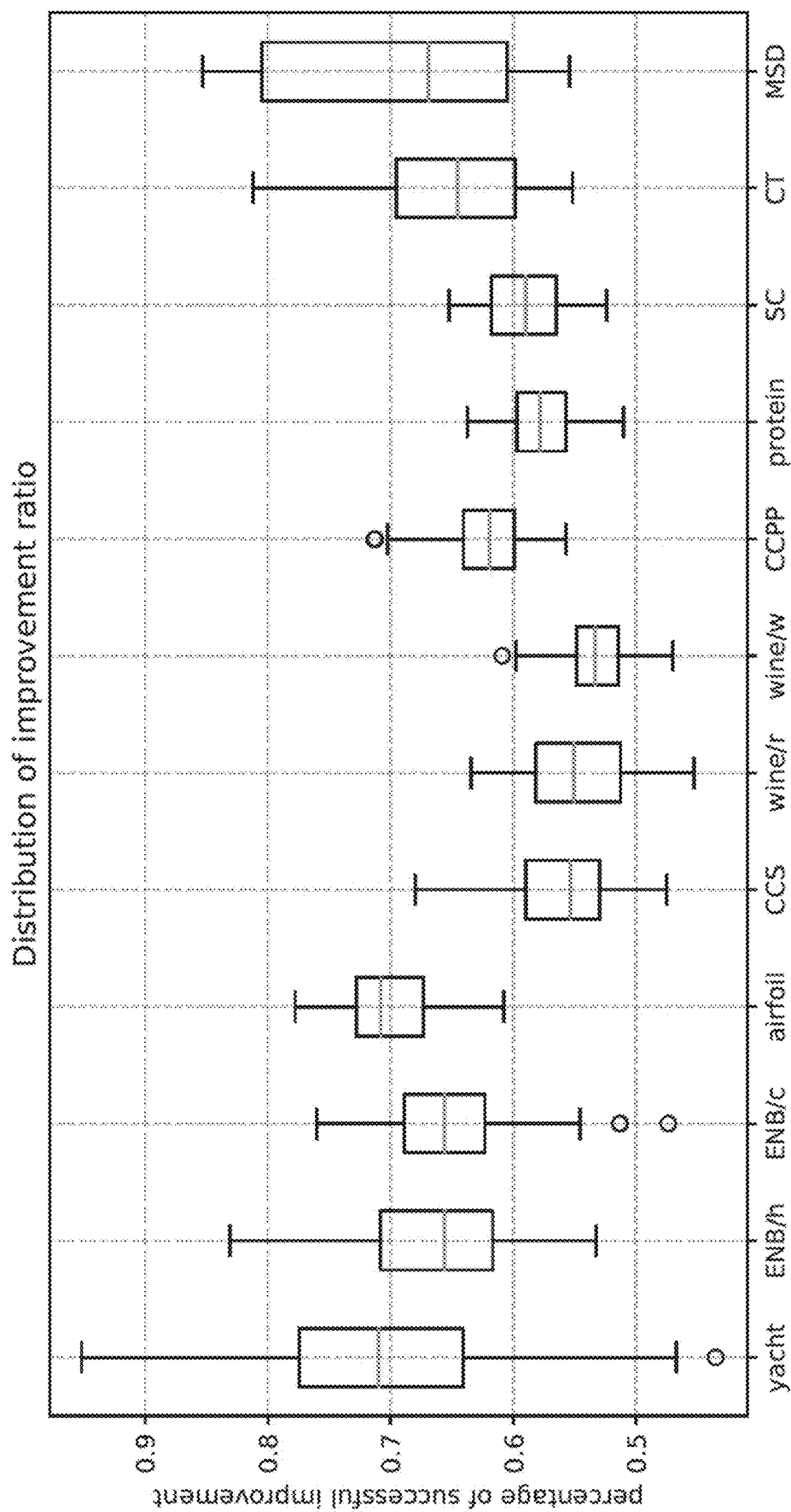
FIG. 6 plots distribution of improvement ratio (IR) values over 100 independent runs (random dataset split except for MSD, random NN initialization and training) on each dataset.

To better study the behaviors of RIO, a new performance metric is defined, called improvement ratio (IR), which is the ratio between number of successful corrections (successfully reducing the prediction error) and total number of data points. For each run on each dataset, this IR value is calculated, and the distribution of IR values over 100 independent runs (random dataset split except for MSD, random NN initialization and training) on each dataset is plotted in FIG. 6. According to the results, the IR values for RIO are above 0.5 in most cases. For 7 datasets, IR values are above 0.5 in all 100 independent runs. For some runs in yacht, ENB, CT, and MSD, the IR values are above 0.8 or even above 0.9. All these observations show that RIO is making meaningful corrections instead of random perturbations.

For comparison, the IR empirical analysis was conducted for two RIO variants, namely R+I (predicting residuals with only input kernel) and R+O (predicting residuals with only output kernel). From the results, the output kernel is helpful in problems where input kernel does not work well (CT and MSD), and it also shows more robust performance in terms of improvement ratio (IR) in most datasets. However, it is still generally worse than full RIO. More specifically, R+I shows an extremely low IR in at least one dataset (CT) dataset. This is because the input kernel itself is not able to learn anything from the complex high-dimensional input space, so it treats everything as noise. As a result, it keeps the NN output unchanged during correction in most cases. Applying output kernel instead solves the issue. The behaviors of RIO are either a mixture or selection between R+I and R+O. Accordingly, RIO with I/O kernel is able to choose the best kernel among these two or combines both if needed.

Accordingly, applying RIO to NNs not only provides additional uncertainty information, but also reliably reduces the point-prediction error.

The present embodiments exploit the recognition by the inventors that given a pretrained NN, fitting the pretrained NN's residuals with a GP can yield useful uncertainty information, while leading to prediction error lower than the NN or GP alone. More particularly, due to its high expressivity, a pretrained NN may have learned complex structure that a GP would model poorly, when selecting a kernel that would capture this complexity is infeasible. Fitting a GP to the residuals of the NN is easier, since this complex structure has been removed, and takes advantage of the predictive power of the NN, while providing useful uncertainty estimates. Thus, while it is known to produce a model with uncertainty information by simply training a GP directly on $\mathcal{D}$, for problems with enough complexity, GP model selection (i.e., specifying an appropriate class of kernels) is challenging. Fortunately, the pretrained NN may have learned a useful representation of this complexity, which can then be exploited.

Further, the present embodiments also support the concept that GP using the proposed I/O kernel is more robust than the standard GP, i.e., using the input kernel alone. First, it is assumed that the output of an NN can contain valuable information about its behavior, and, consequently, the structure of the target function. Next, the optimizer associated with the GP simultaneously optimizes the hyperparameters of both kernels, so the less useful kernel usually receives a smaller signal variance. As a result, the I/O kernel is resilient to failures of either kernel. In particular, the GP using I/O kernel improves performance even in the case where the problem is so complex that Euclidean distance in the input space provides no useful correlation information or when the input space contains some noisy features. Conversely, when the NN is a bad predictor, and $h_{NN}$ is no better than noise, the standard GP with input kernel alone is recovered. In other words, the I/O kernel is never worse than using the input kernel alone, and in practice it is often better.

Though the RIO process experiments and comparisons described above are generally described with respect to a standard NN, the applicability of the RIO process is not so limited. The RIO process is applicable to more complex NN models, as well as other predictive models. For example, RIO can be applied to modern deep convolutional architectures which are important for addressing large-scale problems. The efficacy of RIO as an off-the-shelf solution for improving results, without interfering with the underlying NN architecture, meets an important need in the art. Table 4 provides results of the application of RIO to a recent pretrained NN for age estimation described in Tsun-Yi Yang et al., Ssr-net: A compact soft stagewise regression network for age estimation. In *Proc. of IJCAI*, pp. 1078-1084, 2018, the contents of which is incorporated herein by reference. The pretrained Age Estimation NN model and all data preprocessing were taken exactly from the official code release. The Age Estimation NN model is a variant of DenseNet-121 (described in Gao Huang, et al., Densely connected convolutional networks, In *Proc. of CVPR*, pp. 4700-4708, 2017, incorporated herein by reference) and uses the IMDB age estimation dataset, which contains approximately 172K RGB images. The goal of the Age Estimation NN model is to predict the age of the individual in each image. The features for the GP input kernel were simply a global max pool of the Age Estimation NN model's first stage output. From Table 4, RIO substantially improves upon the mean absolute error (MAE) of the pretrained Age Estimation NN model, outperforms SVGP in terms of both MAE and NLPD, and yields realistic confidence intervals (CIs). SVGP effectively learns nothing, so it estimates almost all variance as noise, while RIO effectively augments the pretrained model. Note that CI coverage means the percentage of testing outcomes that are within the estimated CI.

TABLE 4

| Method | MAE | NLPD | 95% CI Coverage | 90% CI Coverage | 68% CI Coverage |
|---|---|---|---|---|---|
| Pretrained DenseNet | 7.43 | — | — | — | — |
| SVGP | 36.45 | 5.06 | 0.99 | 0.96 | 0.62 |
| RIO | 6.35 | 3.59 | 0.94 | 0.91 | 0.75 |

Further, in principle, RIO can be applied to any prediction model since it treats the pretrained model as a black box. In an alternative embodiment, RIO is applied to another classical prediction model well known to those skilled in the art—Random Forests (RF). Referring to the description above with respect to the standard NN comparisons, the same experimental setup is used. For RF, the number of estimators is set as 100 for all datasets. To avoid overfitting, the minimum number of samples required to be at a leaf node is 10 for all datasets, and the max depth of the tree is 7 for MSD and 5 for all other datasets. Table 5 shows the experimental results. From Table 5, RIO performs the best or equals the best method (based on statistical tests) in 9 out of 12 datasets in terms of both RMSE and NLPD. In addition, RIO significantly improves the performance of original RF in 11 out of 12 datasets. These results demonstrate the robustness and broad applicability of RIO.

TABLE 5

| Dataset n × d | Method | RMSE mean ± std | NLPD mean ± std | Noise Variance | Time (sec) |
|---|---|---|---|---|---|
| yacht 308 × 6 | NN | 2.20 ± 0.93†‡ | — | — | 3.33 |
| | RIO | 1.40 ± 0.50 | 1.883 ± 0.568 | 0.74 | 25.67 |
| | R + I | 1.93 ± 0.65†‡ | 2.266 ± 0.484†‡ | 2.19 | 5.59 |
| | R + O | 1.78 ± 0.57†‡ | 2.176 ± 0.525†‡ | 1.39 | 6.76 |
| | Y + O | 1.78 ± 0.56†‡ | 2.204 ± 0.509†‡ | 1.60 | 23.99 |
| | Y + IO | 1.40 ± 0.44 | 1.919 ± 0.567 | 0.82 | 45.69 |
| | SVGP | 3.67 ± 0.60†‡ | 2.689 ± 0.111†‡ | 12.07 | 42.59 |
| | NNGP | 12.40 ± 1.45†‡ | 35.18 ± 0.534†‡ | — | 7347 |
| | ANP | 7.59 ± 3.20†‡ | 1.793 ± 0.887†‡ | — | 40.82 |
| ENB/c 768 × 8 | NN | 1.87 ± 0.42†‡ | — | — | 11.79 |
| | RIO | 1.51 ± 0.35 | 1.852 ± 0.198 | 1.59 | 48.53 |
| | R + I | 1.70 ± 0.41†‡ | 1.98 ± 0.21†‡ | 2.17 | 10.96 |
| | R + O | 1.75 ± 0.41†‡ | 2.011 ± 0.211†‡ | 2.21 | 10.85 |
| | Y + O | 1.75 ± 0.41†‡ | 2.012 ± 0.210†‡ | 2.27 | 39.52 |
| | Y + IO | 1.62 ± 0.35†‡ | 1.936 ± 0.197†‡ | 1.86 | 70.94 |
| | SVGP | 2.52 ± 0.21†‡ | 2.363 ± 0.072†‡ | 6.31 | 84.32 |
| | NNGP | 4.91 ± 0.32†‡ | 30.14 ± 0.886†‡ | — | 7704 |
| | ANP | 4.81 ± 2.15†‡ | 2.698 ± 0.548†‡ | — | 64.11 |
| CCS 1030 × 8 | NN | 6.25 ± 0.49†‡ | — | — | 6.54 |
| | RIO | 5.96 ± 0.47 | 3.230 ± 0.108 | 25.37 | 14.31 |
| | R + I | 5.99 ± 0.47†‡ | 3.235 ± 0.107 | 26.04 | 4.91 |
| | R + O | 6.19 ± 0.49†‡ | 3.280 ± 0.112†‡ | 27.43 | 4.04 |
| | Y + O | 6.18 ± 0.48†‡ | 3.276 ± 0.109†‡ | 27.65 | 17.55 |
| | Y + IO | 6.03 ± 0.47†‡ | 3.246 ± 0.107†‡ | 26.24 | 41.89 |
| | SVGP | 6.62 ± 0.37†‡ | 2.297 ± 0.045†‡ | 41.15 | 73.66 |
| wine/w 4898 × 11 | NN | 0.723 ± 0.027†‡ | — | — | 8.51 |
| | RIO | 0.704 ± 0.018 | 1.088 ± 0.034 | 0.38 | 49.96 |
| | R + I | 0.700 ± 0.017†‡ | 1.079 ± 0.033†‡ | 0.38 | 26.43 |
| | R + O | 0.710 ± 0.021†‡ | 1.095 ± 0.037†‡ | 0.39 | 8.87 |
| | Y + O | 0.710 ± 0.020†‡ | 1.093 ± 0.037†‡ | 0.39 | 29.97 |
| | Y + IO | 0.704 ± 0.018‡ | 1.088 ± 0.034 | 0.38 | 66.79 |
| | SVGP | 0.713 ± 0.016†‡ | 1.076 ± 0.022†‡ | 0.5 | 158.1 |
| ENB/h 768 × 8 | NN | 0.94 ± 0.37†‡ | — | — | 10.14 |
| | RIO | 0.64 ± 0.26 | 0.968 ± 0.273 | 0.31 | 45.04 |
| | R + I | 0.70 ± 0.33†‡ | 1.043 ± 0.317†‡ | 0.41 | 22.22 |
| | R + O | 0.72 ± 0.31†‡ | 1.084 ± 0.309†‡ | 0.41 | 20.49 |
| | Y + O | 0.78 ± 0.35†‡ | 1.163 ± 0.328†‡ | 0.55 | 55.23 |
| | Y + IO | 0.66 ± 0.26†‡ | 1.013 ± 0.280†‡ | 0.34 | 82.82 |
| | SVGP | 2.01 ± 0.17†‡ | 2.145 ± 0.071†‡ | 4.24 | 79.46 |
| | NNGP | 4.97 ± 0.29†‡ | 32.40 ± 0.638†‡ | — | 7374 |
| | ANP | 4.08 ± 0.27†‡ | 2.475 ± 0.559†‡ | — | 102.3 |
| airfoil 1505 × 5 | NN | 4.84 ± 0.47†‡ | — | — | 8.96 |
| | RIO | 3.06 ± 0.20 | 2.551 ± 0.058 | 9.44 | 104.0 |
| | R + I | 3.13 ± 0.21†‡ | 2.573 ± 0.059†‡ | 9.91 | 73.22 |
| | R + O | 4.16 ± 0.27†‡ | 2.848 ± 0.068†‡ | 16.58 | 10.92 |
| | Y + O | 4.21 ± 0.27†‡ | 2.862 ± 0.082†‡ | 17.89 | 38.69 |
| | Y + IO | 3.19 ± 0.30†‡ | 2.583 ± 0.087†‡ | 10.24 | 119.95 |
| | SVGP | 3.27 ± 0.20†‡ | 2.608 ± 0.056†‡ | 10.56 | 106.0 |
| | NNGP | 6.54 ± 0.23†‡ | 33.60 ± 0.420†‡ | — | 3355 |
| | ANP | 21.17 ± 30.72†‡ | 5.399 ± 6.316†‡ | — | 231.7 |
| wine/r 1599 × 11 | NN | 0.688 ± 0.039†‡ | — | — | 3.26 |
| | RIO | 0.671 ± 0.033 | 1.088 ± 0.087 | 0.28 | 20.12 |
| | R + I | 0.668 ± 0.033†‡ | 1.080 ± 0.085†‡ | 0.28 | 12.61 |
| | R + O | 0.675 ± 0.033†‡ | 1.094 ± 0.088†‡ | 0.29 | 4.96 |
| | Y + O | 0.674 ± 0.033†‡ | 1.089 ± 0.086†‡ | 0.29 | 17.01 |
| | Y + IO | 0.671 ± 0.032 | 1.087 ± 0.086 | 0.28 | 34.45 |
| | SVGP | 0.642 ± 0.028†‡ | 0.973 ± 0.042†‡ | 0.39 | 70.53 |

TABLE 5-continued

| Dataset n × d | Method | RMSE mean ± std | NLPD mean ± std | Noise Variance | Time (sec) |
|---|---|---|---|---|---|
| CCPP | NN | 4.94 ± 0.49†‡ | — | — | 17.38 |
| 9568 × 4 | RIO | 4.03 ± 0.13 | 2.808 ± 0.025 | 16.21 | 151.3 |
| | R + I | 4.04 ± 0.13†‡ | 2.810 ± 0.026†‡ | 16.28 | 116.0 |
| | R + O | 4.33 ± 0.14†‡ | 2.880 ± 0.029†‡ | 18.56 | 19.02 |
| | Y + O | 13.40 ± 63.01‡ | 3.012 ± 0.663†‡ | 4161 | 100.8 |
| | Y + IO | 4.71 ± 1.51†‡ | 2.969 ± 0.271†‡ | 33.58 | 267.1 |
| | SVGP | 4.25 ± 0.13†‡ | 2.859 ± 0.028†‡ | 17.94 | 334.6 |

The symbols † and ‡ indicate that the difference between the marked entry and RIO is statistically significant at the 5% significance level using paired t-test and Wilcoxon test, respectively. The best entries that are significantly better than all the others under at least one statistical test are marked in boldface (ties are allowed).

As discussed herein, RIO can be directly applied to any standard NN without modification to the model architecture or training pipeline. Moreover, retraining of the original NN or change of inference process are not required. The RIO process simply requires the inputs and outputs of a NN; it does not need to access any internal structure. This add-on attribute of the RIO process makes it accessible to practitioners in real-world applications, e.g., data scientists can train NNs using traditional pipelines, then directly apply RIO to the trained NNs.

RIO also provides robustness to a type of adversarial attack. Consider a worst-case scenario, in which an adversary can arbitrarily alter the output of the NN with minuscule changes to the input. It is well-known to those skilled in the art that there are NNs for which this is possible. In such a case, with the help of the I/O kernel, the model becomes highly uncertain with respect to the output kernel. A confident prediction then requires both input and output to be reasonable. In the real world, a high degree of uncertainty may meet a threshold for disqualifying the prediction as outside the scope of the model's ability.

In addition to the exemplary embodiments described herein, RIO may be applied to reinforcement learning (RL) algorithms, which usually use standard NNs for reward predictions, to determine uncertainty estimation of the future rewards. Agents can then directly employ efficient exploration strategies, e.g., bandit algorithms, rather than traditional stochastic approaches like ε-greedy. Next, RIO may be applied to Bayesian optimization (BO) to facilitate the use of standard NNs in surrogate modeling. This approach can potentially improve the expressivity of the surrogate model and the scalability of BO. Further still, since RIO only requires access to the inputs and outputs of NNs, it could be directly applied to any existing prediction models, including hybrid and ensemble models as shown in the RF example underlying Table 4. This general applicability makes RIO a more general tool for real-world practitioners.

The real-world applications for predictive tools is limitless. Accordingly, the present embodiments which improve such predictions by providing confidence metrics are likewise applicable to solving real-world problems in nearly any domain and industry including, but not limited to: financial services, e.g., fraud detection, trading strategies, portfolio profiling; Government agencies, e.g., public safety (contraband detection, facial recognition), utilities (e.g., service disruption, theft, routing); health care, e.g., wearable devices and sensors for health assessment in real time, pattern recognition/data trends to identify red flags and improved diagnoses and treatment; Websites, e.g., analysis of consumer buying history for offer/marketing customization through social media, e-mail, etc.; Oil and gas, e.g., identification of new sources, protection of plants and refineries, distribution refinement; transportation, e.g., route efficiency; cybersecurity; imaging and sensing data analysis; language processing.

The invention claimed is:

1. A process for estimating residuals of a neural network (NN) model to determine uncertainty in the NN model's predictions of a value of at least one of a physical, chemical or electrical variable, the process comprising:
    training, by a processor, a NN model to make one or more predictions of the value of the at least one of a physical, chemical or electrical variable using a training data ($\mathcal{X}$, y) input set, wherein the training data input set includes $(x_i, y_i))^n_{i=1}$ wherein $y_i$ are the expected outcomes by the NN model given input $x_i$;
    storing, by the processor, an output data set from the NN model, including the one or more predictions resulting from operation on the training data input set, wherein the output data set includes $(x_i, \hat{y}_i)\}^n_{i=1}$, wherein $\hat{y}_i$ are the predicted outcomes by the NN model given input $x_i$; and
    training, by the processor, a Gaussian process (GP) to estimate residuals of the NN model when applied to raw input data x* using the training data input set $(x_i, y_i))^n_{i=1}$ and the output data set $(x_i, \hat{y}_i))^n_{i=1}$,
    wherein the training of the Gaussian process (GP) includes:
        calculating, by the processor, residuals $r=\{r_i=y_i-\hat{y}_i\}^n_{i=1}$ wherein r denotes the vector of all residuals and $\hat{y}$ denotes the vector of all NN model predictions;
        calculating, by the processor, an n×n covariance matrix at all pairs of training points based on a composite kernel $K_c((\mathcal{X}, \hat{y}), (\mathcal{X}, \hat{y}))$, where each entry is given by $k_c((x_i, \hat{y}_i), (x_j, \hat{y}_j))=k_{in}(x_i, x_j)+k_{out}(\hat{y}_i, \hat{y}_j)$, for i,j=1,2, . . . , n; and
        optimizing, by a gradient-based optimizer, GP hyperparameters $\sigma^2_{in}, l_{in}, \sigma^2_{out}, l_{out}$, and $\sigma^2_n$ by maximizing log marginal likelihood $$\log p(r | \mathcal{X}, \hat{y}) = -\frac{1}{2}r^T(K_c((\mathcal{X}, \hat{y}), (\mathcal{X}, \hat{y})) + \sigma^2_n I)^{-1}r - \frac{1}{2}\log|K_c((\mathcal{X}, \hat{y}), (\mathcal{X}, \hat{y})) + \sigma^2_n I| - n/2\log 2\pi.$$

2. The process according to claim 1, wherein the NN model is a fully connected feed-forward network.

3. The process according to claim 1, further comprising:
    applying, by the processor, the trained Gaussian process (GP) to predictions $\hat{y}_*$ of a neural network (NN) model applied to raw input data $x_*$, the applying including:
    calculating, by the processor, residual mean;
    calculating, by the processor, residual variance; and
    returning, by the processor, distribution of calibrated prediction $\hat{y}'_*$.

4. The process according to claim 3, further comprising
calculating, by the processor, residual mean in accordance with $\tilde{r}_* = k^T_*(K_c((\mathcal{X}, \hat{y}), (\mathcal{X}, \hat{y})) + \sigma^2_n I)^{-1} r$;

calculating, by the processor, residual variance in accordance with $\mathrm{var}(\hat{r}_*) = k_c((x_*, \hat{y}_*), (x_*, \hat{y}_*)) - k^T_*(K_c((\mathcal{X}, \hat{y}), (\mathcal{X}, \hat{y})) + \sigma^2_n I)^{-1} k_*$; and returning, by the processor, a distribution of calibrated prediction $\hat{y}'_2$ in accordance with $\hat{y}'_* \sim \mathcal{N}(\hat{y}_* + \tilde{r}_*, \mathrm{var}(\hat{r}_*))$.

5. The process according to claim 3, wherein the NN model is a fully connected feed-forward network.

\* \* \* \* \*